(12) United States Patent
Sanders

(10) Patent No.: US 10,160,158 B2
(45) Date of Patent: *Dec. 25, 2018

(54) PIPE-LINER EVERSION SYSTEM AND METHOD

(71) Applicant: Simon Sanders, Salisbury (GB)

(72) Inventor: Simon Sanders, Salisbury (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,121

(22) Filed: Aug. 1, 2017

(65) Prior Publication Data

US 2017/0326784 A1    Nov. 16, 2017

Related U.S. Application Data

(63) Continuation-in-part of application No. 14/615,056, filed on Feb. 5, 2015, now Pat. No. 9,724,873, which
(Continued)

(30) Foreign Application Priority Data

Dec. 19, 2008 (GB) .................................. 0823174.8
Jul. 30, 2009 (GB) .................................. 0913281.2

(51) Int. Cl.
*E04B 2/00* (2006.01)
*E04F 13/00* (2006.01)
(Continued)

(52) U.S. Cl.
CPC .............. *B29C 63/36* (2013.01); *B29C 63/28* (2013.01); *B29C 63/346* (2013.01); *B29C 73/04* (2013.01);
(Continued)

(58) Field of Classification Search
CPC ......... B29C 63/34; B29C 63/36; B29C 65/00; B29C 65/48; B29C 65/483; B29C 65/4835; B29C 66/00; B29C 66/004; B29C 66/005; B29C 66/5221; B29C 66/5227; B29C 66/52271; B29C 66/52272; B29C 66/612; B29C 66/632; B29C 66/634; F16L 55/1651; F16L 55/18; F16L 55/1656; F16L 55/179
(Continued)

(56) References Cited

U.S. PATENT DOCUMENTS 5,044,405 A * 9/1991 Driver ................. F16L 55/1651
138/98
5,407,630 A * 4/1995 Smith ................. B29C 47/0004
156/287
(Continued)

*Primary Examiner* — Philip C Tucker
*Assistant Examiner* — Brian R Slawski

(57) ABSTRACT

A pipe-liner system for lining a pipe and methods of use thereof. A continuous, eversible extended liner is formed from a pipe-liner attached to an extender-tube via a substantially leak-proof connection there between. Lengths of the extender-tube and the pipe-liner are each chosen so that the pipe-liner is caused to be accurately positioned within the pipe upon everting the extended liner into the pipe by a pressurized fluid. The pipe-liner is held against an interior surface of the pipe being lined by inserting an inflatable bladder into the extended liner and filling the bladder with pressurized fluid. When a resin in the pipe-liner has hardened, the bladder is removed and the extender-tube is detached from the pipe-liner.

20 Claims, 13 Drawing Sheets

Related U.S. Application Data is a continuation-in-part of application No. 13/140,760, filed as application No. PCT/GB2009/002922 on Dec. 21, 2009, now abandoned.

(51) Int. Cl.

| | | |
|---|---|---|
| *B29C 73/00* | (2006.01) |
| *B32B 43/00* | (2006.01) |
| *B65C 3/26* | (2006.01) |
| *B29C 65/00* | (2006.01) |
| *B32B 37/00* | (2006.01) |
| *C09J 5/00* | (2006.01) |
| *B29C 63/00* | (2006.01) |
| *F16L 55/16* | (2006.01) |
| *B29D 24/00* | (2006.01) |
| *B28B 19/00* | (2006.01) |
| *B29C 45/14* | (2006.01) |
| *F16L 55/18* | (2006.01) |
| *B29C 63/36* | (2006.01) |
| *F16L 55/165* | (2006.01) |
| *B29C 63/34* | (2006.01) |
| *B29C 73/04* | (2006.01) |
| *B29C 63/28* | (2006.01) |
| *B29L 23/00* | (2006.01) |
| *B29C 65/48* | (2006.01) |

(52) U.S. Cl.
CPC ....... *F16L 55/1651* (2013.01); *F16L 55/1654* (2013.01); *F16L 55/1656* (2013.01); *F16L 55/18* (2013.01); *B29C 65/483* (2013.01); *B29C 66/004* (2013.01); *B29C 66/005* (2013.01); *B29C 66/5221* (2013.01); *B29C 66/612* (2013.01); *B29C 66/632* (2013.01); *B29L 2023/22* (2013.01)

(58) Field of Classification Search
USPC ..... 156/60, 71, 94, 156, 160, 229, 293, 294, 156/296, 304.1, 304.2, 307.1, 307.3, 701; 138/97, 98; 264/36.17, 269, 516; 405/150.1, 184.2
See application file for complete search history.

(56) References Cited

U.S. PATENT DOCUMENTS

| | | | |
|---|---|---|---|
| 5,964,249 A | 10/1999 | Kiest | |
| 6,199,591 B1* | 3/2001 | Kiest, Jr. | ................. B29C 63/36 138/97 |
| 9,724,873 B2* | 8/2017 | Sanders | ................. B29C 63/36 |
| 2006/0130922 A1 | 6/2006 | Kamiyama et al. | |
| 2008/0169036 A1 | 7/2008 | Kamiyama et al. | |
| 2008/0236692 A1 | 10/2008 | Kiest | |
| 2008/0277012 A1* | 11/2008 | Anders | ............... F16L 55/1651 138/98 |

* cited by examiner

PIPE-LINER EVERSION SYSTEM AND METHOD

CROSS REFERENCE

This application is a continuation-in-part and claims benefit of U.S. patent application Ser. No. 14/615,056 filed Feb. 5, 2015 now U.S. Pat. No. 9,724,873, which is a continuation-in-part and claims benefit of U.S. patent application Ser. No. 13/140,760 filed Jun. 17, 2011, which is a 371 of PCT/GB2009/002922 filed Dec. 21, 2009, which claims priority to Foreign Application No. GB 0823174.8 filed Dec. 19, 2008 and Foreign Application No. GB 0913281.2 filed Jul. 30, 2009, the specification(s) of which is/are incorporated herein in their entirety by reference.

FIELD OF THE INVENTION

The present invention relates to relates to pipe-liners, pipe-liner systems, and pipe-liner methods.

BACKGROUND OF THE INVENTION

Pipes are often installed underground or in areas where access can be difficult. Even though a pipe installation may last for many years, it is sometimes necessary to repair the pipe installation due many factors, such as earthquakes, corrosion, impact, tree root damage, or leakage. In certain cases, the defective pipe can be repaired by lining it with a durable pipe-liner, hereinafter referred to as a liner, thus prolonging the life of the installation by many years; however, installing the liner can be difficult due to the limited availability for sufficient access.

The liner may comprise a combination of materials, construction and method of use such that it is flexible whilst being inserted and becomes rigid or may be caused to become rigid after being positioned in the pipe being lined. A common type of liner is a cured-in-place pipe (CIPP) liner comprising a tube of felt or other flexible absorbent material enclosed in a flexible and substantially impermeable plastic skin, such as polyvinyl chloride or polyurethane, and impregnated with a liquid material, such as resin, that hardens or may be caused to harden following insertion of the liner into the pipe.

One method for inserting a liner is to evert (e.g. turn inside out) it into position within a pipe, so that it turns inside-out and what was previously the external surface forms the inner surface of the liner. Eversion is usually achieved by positioning the end of the liner so that it passes through a nozzle and is turned back over and fastened in place around the nozzle so that, when fluid such as air or water is introduced under pressure through the nozzle, the liner may be caused to turn inside out or evert so that it is drawn through and extends progressively beyond the nozzle. The everting end of the liner may be inserted in the end of a pipe and the continuing application of fluid under pressure causes the liner to evert and extend into the pipe. The nozzle is usually incorporated into a chamber that may be pressurized with a pressurizing fluid or into the end of a vertical tube that may be filled with a liquid, such as water, and the liner is partly or wholly contained within the chamber or tube prior to eversion. Once the liner is fully inserted, it is held in position either by maintaining pressure within it, which requires a provision for the distal end of the liner to be closed to retain the pressurizing fluid, or by means of a length of pressurizable tubing, commonly called an inversion hose, which may be inserted at the same time as the liner or separately everted into the liner after the liner has been put into position in the pipe.

An example of a liner is shown in FIGS. 1 and 2. FIG. 1 depicts the end of a liner in "lay-flat" mode as it exists before being everted. An impervious surface, hereinafter referred to as the skin, forms the exterior of the liner and the body material forms the bulk of the liner. FIG. 2 shows a liner that has been everted through and has emerged out of a pipe. The skin of the liner now forms the inner surface of the liner and the body material forms the exposed exterior of the liner and is in contact with the inner surface of the pipe.

A pressurizable chamber used for everting a liner is called an inversion-drum and may comprise a reel on which the liner is mounted, enclosed within a pressurizable chamber fitted with an outlet nozzle. In alternative embodiments, the pressurizable chamber may be loaded by stuffing or folding the liner, wholly or partly therein, and then closed with a substantially air-tight closure. In all types of pressurizable chambers, the end of the liner passes through the nozzle to the outside of the pressurizable chamber and is everted and fastened round the nozzle with a firm air-tight fastening. When compressed air is applied to the pressurizable chamber, the liner is forced to evert progressively and extend out of the pressurizable chamber and the everting end may be directed into the pipe being lined.

Common inversion-drums are bulky and expensive and may require two or more people to handle them. Smaller versions are available, but their use is limited to shorter liners and they are also fairly expensive, as is a liner-gun comprising a chamber into which a liner may be wholly or partly stuffed and then closed, sealed and pressurized. Some users construct their own pressurizable chambers out of a length of tube fitted with a nozzle at one end and closed at the other, but these can be difficult to load.

When a liner is being everted from an inversion drum at ground level into a drain that runs horizontally underground, part of the section of liner between the inversion drum and the drain usually has to take the form of at least one bend or curve and the nature of the material and construction of the liner usually causes creasing and constriction that hinder the movement of the uneverted part of the liner through the said section of liner between the inversion drum and the drain.

There are also disadvantages with the method of everting a liner by means of a vertical tube filled with water. First, the necessary water supply may not always be readily available. Second, it is often necessary to erect a scaffold platform to support a vertical pipe long enough to deliver the pressure required to drive a liner into a pipe. Third, if the pipe being lined slopes significantly upwards from the point of access, water pressure is progressively reduced at the everting end of the liner as it extends, and if the piper slopes significantly downwards, the weight of water can be too great for the installer or the lining material itself to support. And, fourth, if the eversion process is held up for any reason, it is not possible to raise the operating pressure as a way to get the liner moving again.

There are further difficulties and shortcomings that are common to all of these conventional methods for inserting liners into drains. In the first instance, an everted liner must extend from the point of access to the pipe being lined and cannot be caused to start at a chosen point within a pipe such as beyond a junction where two pipes join. It is possible to make a short localized repairs of up to approximately 2 meters in length, by means of a glass-fiber and resin patch which is wrapped round a semi-rigid bladder called a packer and dragged or pushed into position within a pipe where the packer is pressurized to press and form the patch against the inner surface of the pipe and is then deflated and withdrawn when the resin is cured. However, if the defect is longer than 2 meters or so, several separate patches must be applied or, if a liner is used, holes must be cut in it, both of which increase time and cost. Second, part of the cured liner will always project out of the access end of the pipe being lined and any excess must be trimmed and spillage and contamination must be removed. Third, existing methods for pressurizing an everted liner can involve difficulty and cost. It can be pressurized by closing it at the distal end by, for example, binding it or applying a stopper, but this method can only be used on manhole-to-manhole liners and the end section must be trimmed and the manhole must be made good when the job is finished. Alternatively, a length of inversion hose may be everted simultaneously with the liner, which is a complicated task requiring the operator to thread the liner into the tube beforehand, or it may be dragged in by the liner as it everts which, again, can be complicated or unreliable using existing methods, or it may be inserted into the liner after the liner has been positioned within the pipe being lined, which usually requires that the inversion hose is separately everted into the liner.

An alternative to inverting a liner into a pipe is to drag or push the liner into place and then to pressurize it with a separate pressurizable tube which is usually everted into the liner after the liner has been dragged into place. This can overcome some of the problems associated with conventional eversion methods, but it carries the major disadvantage that the liner cannot be caused to adhere to the inner surface of the pipe and consequently water or other fluid can enter between the pipe and the liner. Grouting the ends of the liner against the pipe can prevent fluid getting into the drainage system provided that the liner runs uninterrupted between two access manholes, but if access to the liner is from one manhole only, a separate patch will be required over the distal end, thus adding cost and reducing the diameter of the repaired pipe. Also, it can be difficult and often impossible to install a standards-compliant liner at locations where pipes branch or converge.

The present invention features a pipe-liner system for use when lining a pipe interior for repair. The present invention provides a substantial improvement in the field of pipe repair by successfully addressing the difficulty with accessing and repairing a damaged pipe.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

According to one embodiment, the present invention features a pipe-liner system for lining a pipe interior surface of a pipe. The system may comprise an eversible, flexible, substantially-impermeable, elongate, extender-tube having an extender-tube first end and an extender-tube second end, an eversible, flexible, elongate, tubular, pipe-liner having a pipe-liner first end and a pipe-liner second end, and a removable, substantially leak-proof connection connecting the extender-tube second end to the pipe-liner first end. The combined extender-tube and the pipe-liner can form a single, continuous eversible tube, hereinafter referred to as an extended liner.

According to another embodiment, the present invention features a method of lining a pipe. In one embodiment, the method may comprise providing the eversible extended liner, choosing the extender-tube length so that the pipe-liner is caused to be accurately positioned within the pipe upon eversion into the pipe, choosing the pipe-liner length so that the pipe-liner is caused to be accurately positioned within the pipe upon eversion into the pipe, placing the extender-tube first end exterior to the pipe at a predetermined position from the pipe opening end so that the pipe-liner is caused to be accurately positioned within the pipe upon eversion into the pipe, and everting the combined extender-tube and pipe-liner via fluid under pressure that has been introduced into an interior of the extended liner to drive at least part of the eversion process of the extended liner progressively into the pipe.

The extended liner can be everted such that the extender-tube is first to evert and drags the pipe-liner through the everted extender-tube, the pipe-liner then everts after eversion of the extender-tube is completed, and the pipe-liner becomes positioned at a desired position within the pipe via the selected predetermined extender-tube length, the selected predetermined pipe-liner length, and the placement of the extender-tube first end exterior to the pipe at the predetermined position from the pipe opening end.

One of the unique and inventive technical features of the present invention is the selected predetermined extender-tube length, the selected predetermined pipe-liner length, and the placement of the extender-tube first end exterior to the pipe at the predetermined position from the pipe opening end. Without wishing to limit the invention to any theory or mechanism, it is believed that this technical feature advantageously enables accurate positioning of the pipe-liner within the pipe, and further eliminates the need for multiple access points. Another unique and inventive technical feature of the present invention is the extended liner formed by the extender-tube first end removably connected in series to the pipe-liner via a removable, substantially leak-proof connection. Without wishing to limit the invention to any theory or mechanism, it is believed that this technical feature advantageously allows for facile and simple loading of the extended liner into a launch chamber, as well as quick and easy separation of the extender tube from the pipe-liner.

None of the presently known prior references or work has the unique inventive technical feature of the present invention. In fact, the prior references or work may require the liner to be preloaded into the carrier tube, and may involve complicated loading and launching procedures, in addition to requiring multiple access points for the lining process.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1:
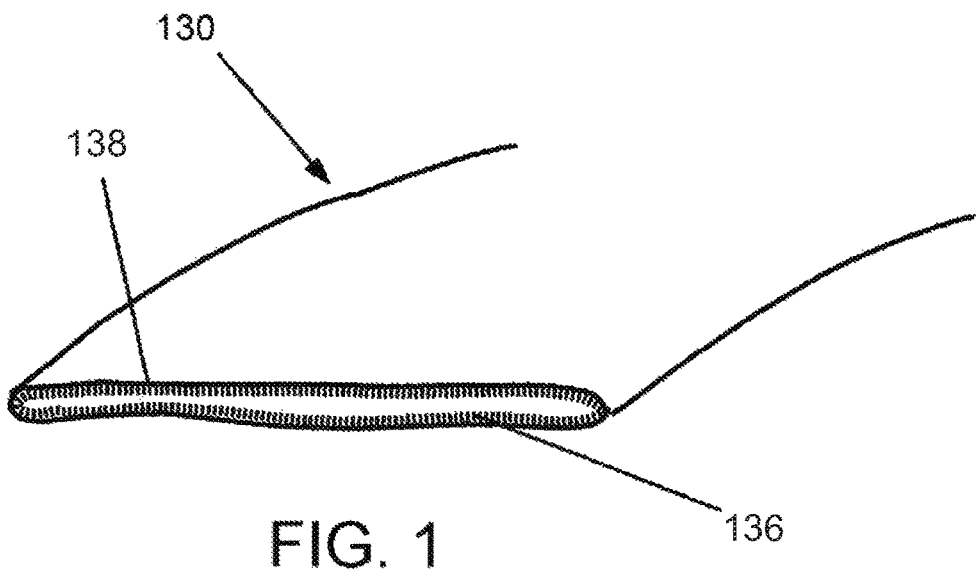
FIG. 1 shows an eversible pipe-liner of the present invention in "lay-flat" mode.
Figure 2:
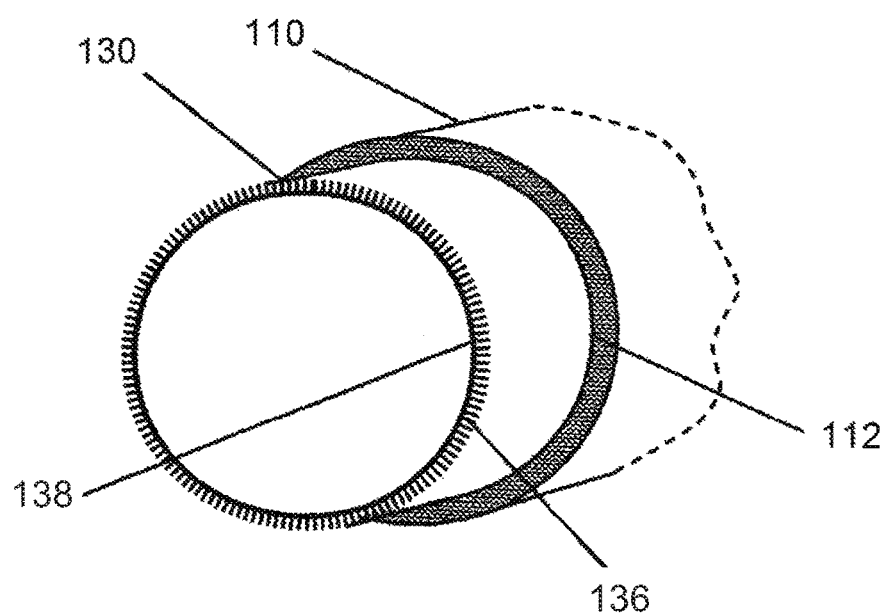
FIG. 2 shows the pipe-liner that has been everted through a pipe.

Following is a list of elements corresponding to a particular element referred to herein:
100 pipe-liner system
110 pipe
112 pipe opening end
114 pipe interior surface
116 pipe interior cavity
120 extender-tube
122 extender-tube first end
124 extender-tube second end
130 pipe-liner
132 pipe-liner first end
134 pipe-liner second end
136 absorbent material
138 plastic skin
140 closure-sleeve
150 extended liner
160 extender-tube/pipe-liner connection
165 flexible intermediate collar or connector sleeve
170 pressure-tube
180 launch chamber
182 outlet aperture of launch chamber
184 interior of launch chamber This invention relates to installing pipe-liners in pipes and provides an extended liner formed from an extender-tube attached to a pipe-liner via an intermediate collar or connector sleeve, together with a launch chamber and a pressure-tube as ancillary materials and equipment for use with or separately from the extended liner for carrying out such installations, and it relates in particular to installing cured-in-place pipe-liners (CIPP liners) in drains.

The invention provides a set of methods and configurations of materials, fixtures and equipment which, severally and collectively address these difficulties with and shortcomings of the existing methods for inserting liners into pipes. They are intended in particular for the purpose of lining drains, thereby providing an economic and practical means for repairing defective drains without digging them up and replacing them. However, the invention may also be applied in other situations where it is required to insert a tubular liner of a material or combination of materials that is initially flexible into a pipe and where the liner subsequently hardens or is caused to adhere to the inner surface of the pipe.

In this description of the invention, there are described parts provided by the invention that are of elongated form and are extended or otherwise moved from an initial position as part of the processes and methods of the invention. Unless the context indicates otherwise, reference to the distal end of any such part relates to the end which, when the part is fully extended or moved, will have moved furthest from the initial position and reference to the proximal end relates to the other end of the part. Reference to the everting end of a part and to the point of eversion relates to the point where an incompletely everted tubular part is turning out and becoming everted; and reference to pressurizing fluid relates to a fluid, such as air or water, that is introduced under pressure into a cavity or void, such as a tube or a pressurizable chamber, or is pressurized when within such cavity or void.

Unless otherwise stated and where appropriate to the context or function, any connection that is made between a part that is tubular in shape and an aperture or nozzle or other part that is tubular in shape is made around the circumferences of the items that are connected and is substantially leak-proof, and where appropriate to the context or function, is flexible and of a form that permits the connected parts to be everted.

In this description of the invention, reference to a pipe-liner relates to a tube of the basic liner material, including, but not limited to, a tube of a flexible carrier material such as felt, prior to preparation for use by, for example, impregnation with resin, or such reference relates to a fully-prepared liner in flexible or hardened form, as appropriate to the context.

A principal component of the invention provides a tube of a flexible impermeable material, such as a plastic or a plastic-coated fabric, hereinafter called an extender-tube. The extender-tube is connected to an eversible pipe-liner so that the combined extender-tube and liner, together with the connection between them, form a single continuous eversible tube, hereinafter referred to as an extended liner. The method of connection may be direct, for example by an abutting or overlapping joint, or by means of an intermediate connector of a form that includes, but is not limited to, an intermediate collar or connector sleeve of a flexible, substantially impermeable material or construction, which may also be elastic.

The invention further provides a method whereby the extended liner is everted progressively in a manner such that the extender-tube is first to evert, followed by the liner. The everting end of the extended liner may be directed into the end of a pipe and the remaining part of the extended liner may be everted fully into the pipe. The lengths of the extender-tube and the pipe-liner may be chosen so that the liner may be caused to be accurately positioned within the pipe with one or both of the ends of the pipe-liner placed at predetermined positions, including for example, at the commencement of the pipe or at a point beyond a junction where there is a branching or convergence of pipes. Means are provided for separating the extender-tube from the pipe-liner when the pipe-liner is in position and for removing it, thereby eliminating the requirement for trimming the pipe-liner at the proximal end. Methods of separation include, but are not limited to, peeling or snapping or otherwise breaking off the extender-tube and any connector, releasing by dissolving or washing away or heating the connection or any adhesive or sealant, and mechanical destruction. In some embodiments, the interior surface of the extender-tube may be marked with a scale or other indicator which is progressively revealed as the extender-tube is everted for purposes that include, but are not limited to, indicating the length of extender-tube that remains to be everted before the join between the extender-tube and the pipe-liner reaches the point of eversion, thereby guiding the user in positioning the pipe-liner within the pipe.

Referring now to FIG. 1-26, the present invention features a pipe-liner system (100) for lining a pipe interior surface (114) of a pipe (110). In some embodiments, the system (100) may comprise an eversible, flexible, substantially-impermeable, elongate, extender-tube (120) having an extender-tube first end (122) and an extender-tube second end (124), an eversible, flexible, elongate, tubular, pipe-liner (130) having a pipe-liner first end (132) and a pipe-liner second end (134), and a removable, substantially leak-proof connection (160) connecting the extender-tube second end (124) to the pipe-liner first end (132). The combined extender-tube (120) and the pipe-liner (130) can form a single, continuous eversible tube, hereinafter referred to as an extended liner (150).

In preferred embodiments, the extender-tube (120) can have a selectable extender-tube length that is measured from the extender-tube first end (122) to the extender-tube second end (124). The pipe-liner (130) can also have a selectable pipe-liner length that is measured from the pipe-liner first end (132) to the pipe-liner second end (134). Without wishing to be bound by a particular mechanism, the extender-tube length and the pipe-liner length may each chosen such that the pipe-liner (130) liner is caused to be accurately positioned within the pipe (110) upon eversion of the extended liner (150).

In some embodiments, the pipe-liner (130) may comprise a tube of an absorbent material (136) impregnated with a hardenable fluid and having an impermeable plastic skin (138). The plastic skin (138) can form an exterior surface of the pipe-liner (130) prior to eversion. Upon eversion of the pipe-liner (130), the impermeable plastic skin (138) then forms an interior surface of the pipe-liner (130) and the absorbent material (136) is configured to interface with the pipe interior surface (114).

In preferred embodiments, the hardenable fluid may be capable of hardening after eversion of the pipe-liner (130). For example, the hardenable fluid may be a resin, such as an epoxy resin. In other embodiments, curing of the hardenable fluid may be accelerated by exposing the fluid to higher temperatures.

Figure 3:
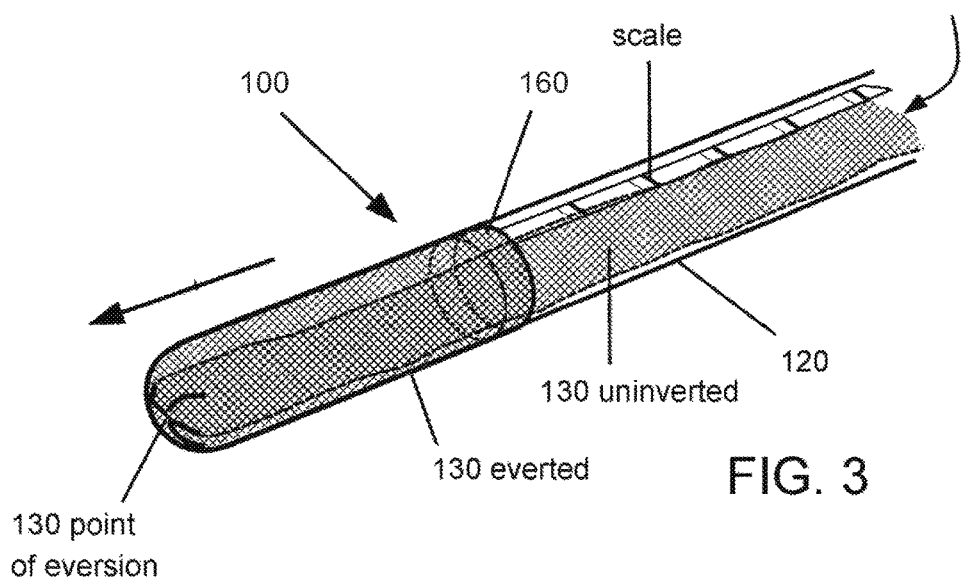
FIG. 3 shows an extended liner of the present invention during eversion. The extended liner may comprise an eversible extender-tube and the eversible pipe-liner fluidly connected thereto.
Figure 4:
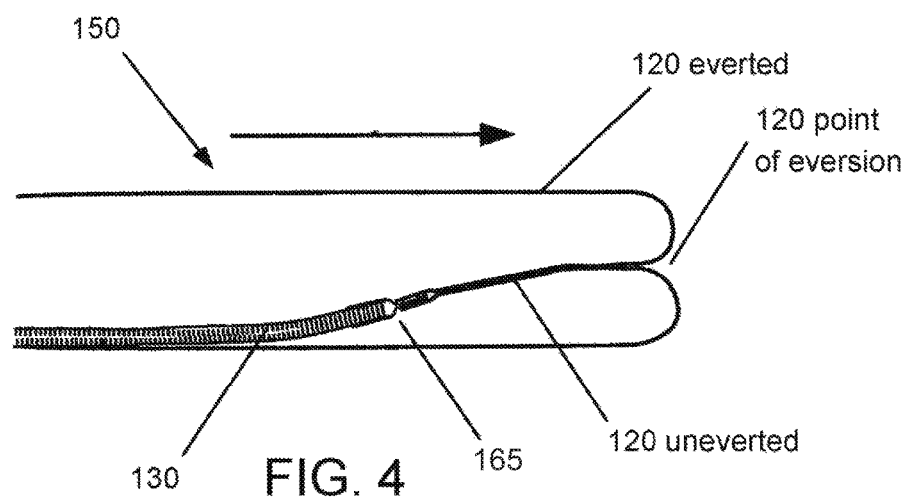
FIG. 4 shows a sectional view of the extended liner where the extender-tube being everted.
Figure 5:
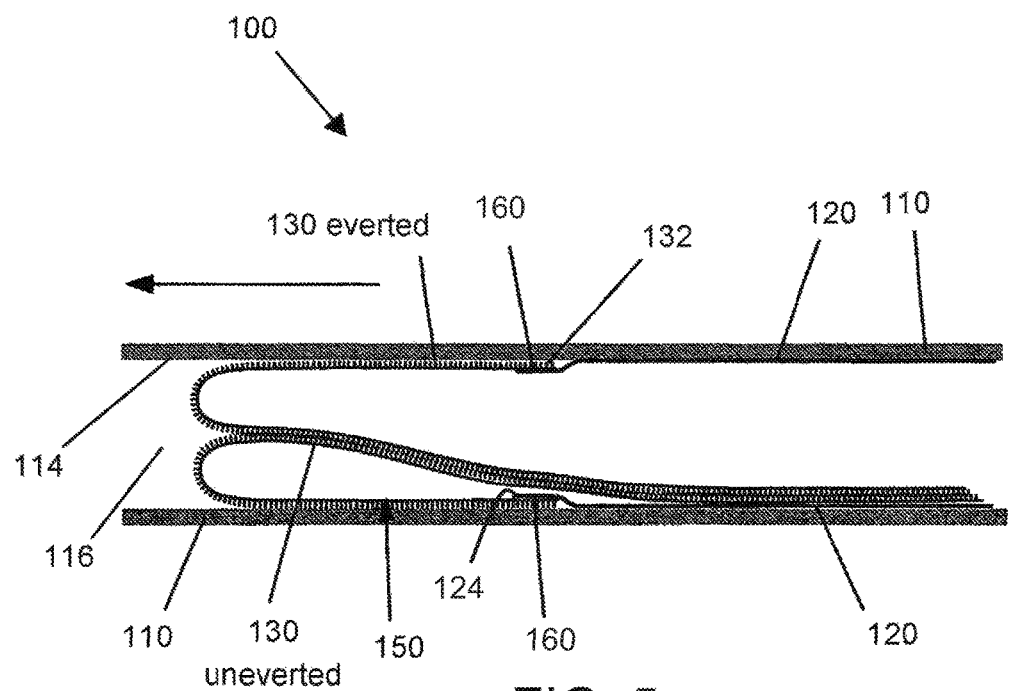
FIG. 5 shows a sectional view of the pipe-liner being everted after eversion of the extender-tube.

The extender-tube and extended liner are illustrated in FIGS. 3, 4, and 5. FIG. 3 shows an extended liner formed by a pipe-liner and an extender-tube that are joined by a connection. A pressurizing fluid that is introduced into the interior of the extended liner causes it to evert and extend progressively. The uneverted part of the liner, that is not yet everted, is located inside the extended liner and is being drawn progressively towards the point of eversion. The liner is depicted by hatching in FIG. 3 and the part of the liner that is located in the interior of the extended liner is identified with a broken-line outline. A scale is marked on the extender-tube.

FIG. 4 provides a longitudinal sectional view of an extended liner where the pipe-liner and the extender-tube are connected by a flexible connector-sleeve. A pressurizing fluid is introduced into the interior of the extended liner, causing it to evert and extend progressively. In this example, the extender-tube is not fully everted and the pipe-liner and the connector-sleeve are in lay-flat mode, as not having yet reached the point of eversion and been everted.

FIG. 5 depicts in longitudinal sectional view a pipe into which the extended liner is being inserted. By means that may include using the scale on the extender-tube (not shown in this figure), it has been possible to ensure that a predetermined length of extender-tube has been everted into the pipe so that the proximal end of the pipe-liner is positioned at a predetermined position within the pipe. A pressurizing fluid is introduced into the interior of the extended liner, causing it to evert and extend progressively. In this illustration, the extender-tube that forms part of the extended liner is fully everted and the uneverted part of the liner is being drawn progressively through the extended liner.

In an exemplary embodiment, when installing the pipe-liner system (100), the extender-tube first end (122) is disposed exterior to the pipe (110) at a selectable predetermined position from the pipe opening end (112). Without wishing to be bound by a particular mechanism, the combined extender-tube (120) and pipe-liner (130) can be everted via fluid under pressure that has been introduced into an interior of the extended liner (150). The pressurized fluid can drive at least part of the eversion process progressively so that the extender-tube (120) can first evert and drag the pipe-liner (130) through the everted extender-tube (120). The pipe-liner (130) can then be everted after the eversion of the extender-tube (120) is completed so that the pipe-liner (130) becomes positioned at a desired position in the pipe (110). Positioning of the pipe-liner at the desired position in the pipe (110) can be achieved by selecting the extender-tube length, the pipe-liner length, and placing the extender-tube first end (122) exterior to the pipe (110) at the selected predetermined distance from the pipe opening end (112) such that the combined lengths and distance is sufficient to place the pipe-liner at the desired position upon eversion of the extended liner.

Figure 6:
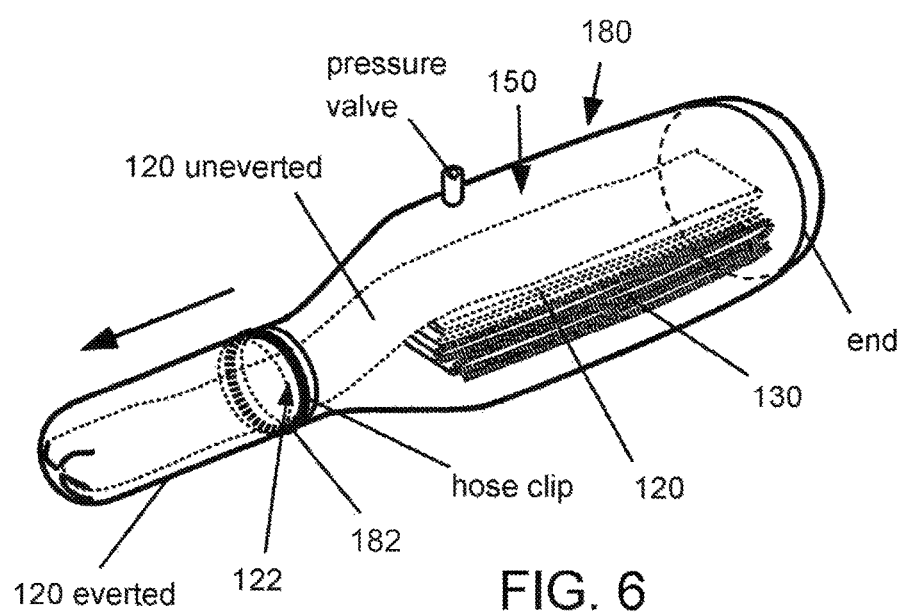
FIG. 6 shows a launch chamber in use with the extended liner during eversion. The launch chamber is loaded with the extender-tube (dotted lines) and the pipe-liner (vertical broken lines) of the extended liner.

In other embodiments, the system (100) may further comprise a pressurizable chamber, hereinafter referred to as a launch chamber (180). In an exemplary embodiment, the extended liner (150) can be loaded into the launch chamber (180). As shown in FIG. 6, a portion of the extender-tube (120) at the extender-tube first end (122) is configured to be disposed through an outlet aperture (182) of the launch chamber, everted (e.g. turned inside out), and then connected back to the outlet aperture (182). In some embodiments, the extender-tube first end (122) is held in place on the outlet aperture (182) by a clamp. When a pressurizing fluid is introduced into the launch chamber, the extended liner may be caused to evert and extend through and beyond the outlet aperture. Without wishing to be bound by a particular mechanism, the launch chamber (180) is configured to be positioned exterior to the pipe (110) such that outlet aperture (182) is adjacent to the pipe opening end (112), and pressurized fluid can then be introduced into an interior (184) of the launch chamber so as to drive at least part of the eversion of the extended liner (150) progressively into the pipe (110). For example, as shown in FIG. 6-9, the pressurized fluid can be introduced through a pressure valve and into the interior (184) of the launch chamber.

Means are provided for access to the interior of the launch chamber so that the liner or extended liner may be loaded into it and for closing the access so that it is substantially leak-proof. In a preferred embodiment, the pressurizable chamber is elongated and of substantially constant cross section over a substantial part of its length and such cross section may preferably be substantially rectangular or oval or circular. Means are provided for loading the extended liner into the launch chamber, including but not limited to, an access aperture of suitable size and at a suitable position on the launch chamber. Means are provided for closing the access aperture whereby a substantially leak-proof seal is achieved, such as by a closure or cover. An outlet aperture or nozzle is fitted to or is integral with the launch chamber or, if preferred or appropriate, is fitted to or is integral with the means for closing the launch chamber such as a closure or cover.

The extended liner can be loaded into the launch chamber, following which the launch chamber is closed, by folding fold the extended liner in loops in a manner such that it will readily be drawn off as it everts and extends and to insert it into the launch chamber. Following the closing of the launch chamber, a pressurizing fluid may be introduced into the launch chamber and pressurized, causing the extended liner to evert and extend out of it through the outlet aperture.

In a further embodiment, the launch chamber is substantially of a flexible impermeable material such as a fabric coated with a plastic. This form of the launch chamber is hereinafter referred to as a launch-bag. In one embodiment, a nozzle with an outlet aperture is fitted to or integral with one end of the launch bag. The end of the extender-tube is passed through the outlet aperture, everted and joined to the nozzle. Means are provided for closing the other end of the launch-bag, hereinafter referred to as the loading end and such means may take any suitable form including the form of a clamp or a closable aperture fitted to the loading end.

In a variant of this embodiment, the extender-tube is attached directly to the launch-bag so that the extender-tube and the launch-bag, both being of flexible impermeable material, are integrated into a single fabrication with no intervening nozzle and, in a further variant of the invention, the extender-tube and the launch-bag are combined and constructed substantially or wholly from a single piece of material. Another further variant of this embodiment of the invention provides a pipe-liner attached directly to the launch-bag so that the two components are integrated into a single fabrication with no intervening extender-tube.

Various embodiment of the launch-chamber are illustrated in FIGS. 6 to 10. In FIG. 6, a launch chamber is shown in general view and the part of a combined extender-tube and pipe-liner forming an extended liner that are folded in loops and located within the launch chamber are depicted in dotted-line. The first end of the extender-tube is everted and turned back over the nozzle that is integral with the launch chamber and is held in place by a hose-clip. A cover closes the access aperture through which the combined extender-tube and pipe-liner are loaded into the launch chamber. By introducing a pressurizing fluid into the launch chamber through the pressure-valve, the combined extender-tube and liner is caused to evert and to extend progressively.

Figure 7:
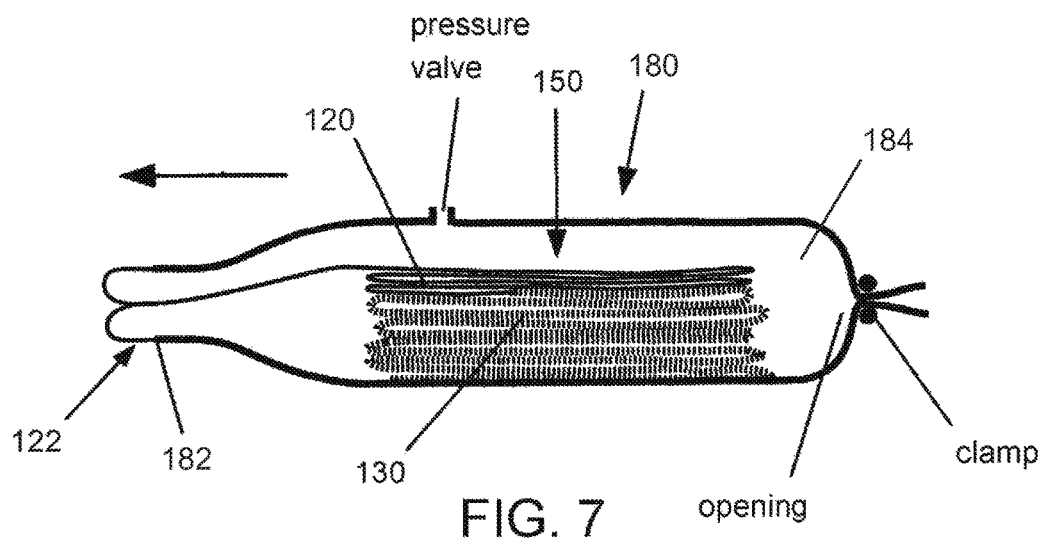
FIG. 7 shows a sectional view of the launch chamber with the extender-tube (solid lines) and the pipe-liner (vertical broken lines) of the extended liner loaded therein.

FIG. 7 shows a longitudinal sectional view of the launch-bag that is substantially cylindrical in form and is constructed from a flexible substantially impermeable material. The extended liner in the form of a combined extender-tube and pipe-liner is loaded into the launch-bag. The first end of the extender-tube projects through an aperture in the outlet end of the launch-bag and is everted and attached to the outlet. An opening at the access end of the launch-bag provides access through which the combined extender-tube and pipe-liner may be loaded into the launch-bag. The opening at the access end of the launch-bag is here shown to be closed and secured by a clamp that presses the material of the launch-bag to close the opening. A pressurizing fluid may be introduced into the launch-bag through a pressure-valve causing the combined extender-tube and pipe-liner to evert and extend progressively.

Figure 8:
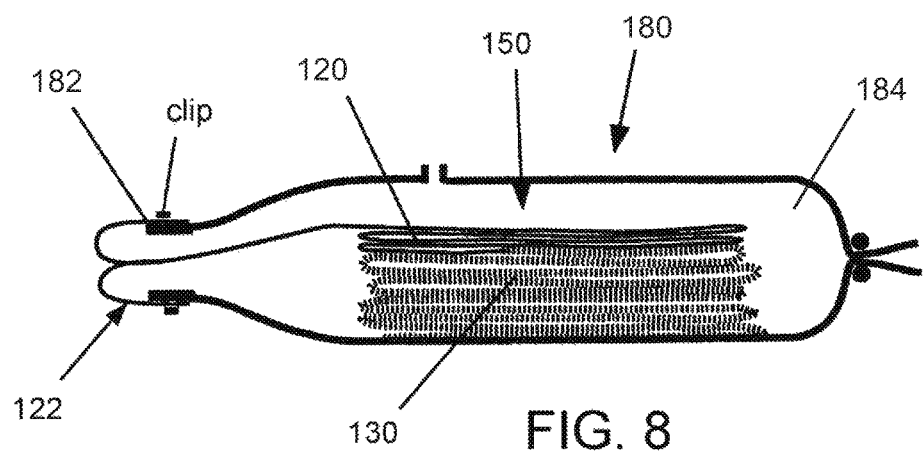
FIG. 8 shows a sectional view of the launch chamber with the extender-tube (solid lines) and the pipe-liner (vertical broken lines) of the extended liner loaded therein. A proximal end of the extender-tube is clamped onto a nozzle of the launch chamber.
Figure 9:
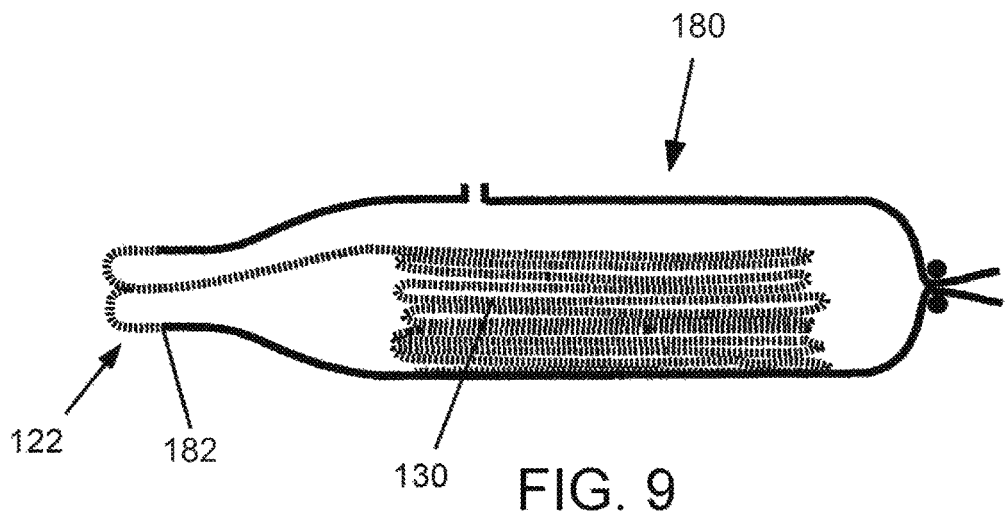
FIG. 9 shows a sectional view of the launch chamber with the pipe-liner loaded therein.

FIG. 8 shows a longitudinal sectional view of the launch-bag. The extended liner in the form of a combined extender-tube and pipe-liner is loaded into the launch-bag and the first end of the extender-tube projects through the outlet aperture and is everted and attached to the nozzle and secured by a hose-clip. FIG. 9 shows a longitudinal sectional view of the launch-bag with a pipe-liner loaded into the launch-bag and the first end of the pipe-liner projects through an aperture in the outlet end of the launch-bag and is everted and attached directly to the aperture.

Figure 10:
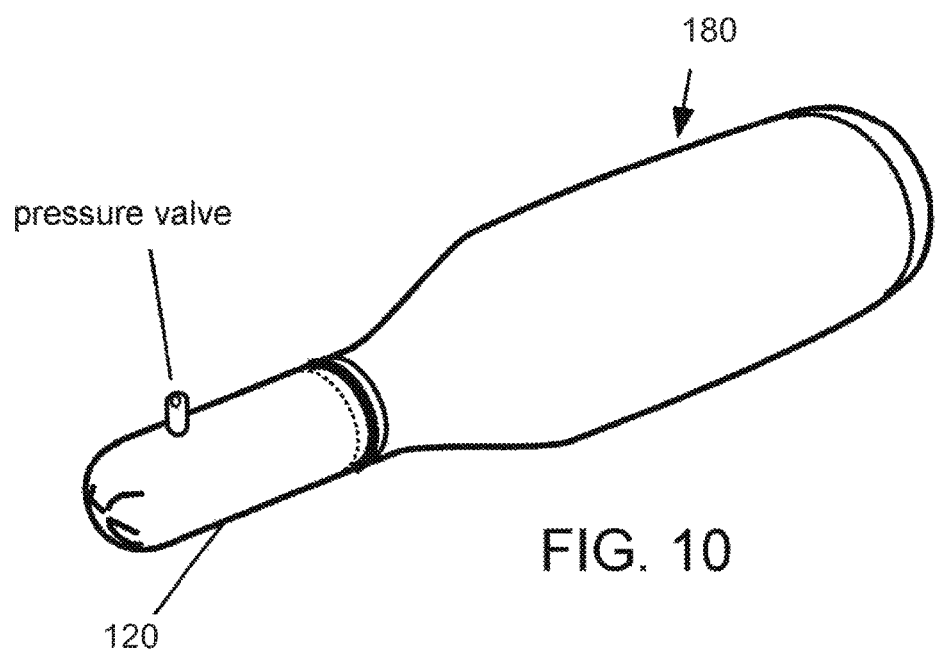
FIG. 10 shows the extender-tube emerging from the launch chamber.

FIG. 10 depicts part of an extender-tube emerging from a launch chamber. The rest of the extended liner is concealed within the launch chamber. A pressure-valve can be fitted to the extender-tube through which pressurizing fluid may be introduced.

In still other embodiments, the system (100) may further comprise a pressure-tube (170), also referred to as a bladder tube. Preferably, the pressure-tube is constructed from a leak-proof, flexible material, such as a plastic-coated fabric.

Without wishing to be bound by a particular mechanism, the pressure-tube (170) may be configured to be inserted into the pipe (110) such that the pressure-tube (170) is positioned at least along the length of the pipe-liner. The pressure-tube (170) can be filled with fluid under pressure so that the pressure-tube can press the pipe-liner (130) against the pipe interior surface (114) being lined.

In some embodiments, the pressure-tube is preferably closed at both ends so that it forms an inherently hermetically closed entity prior to insertion into the pipe-liner or extended liner; but one or both ends may be initially open when the pressure-tube is introduced, in which case, means are provided for closing any open end prior to introducing a pressurizing fluid into the pressure-tube. Pressurizing means are provided whereby a pressurizing fluid may be introduced into the pressure-tube and, if required, for removing it and, in a preferred form, such means may be an aperture or pressure valve. More than one pressure-valve may be provided and the pressure-valve may be incorporated into the main body of the pressure-tube or may be integrated with means for closing any open end of the pressure-tube, for example by gathering the material at the end of the pressure-tube near the pressure-valve and binding or clamping it against the pressure-valve in a sealing manner. The pressure-tube may also include means for introducing and additionally or alternatively for circulating fluid, including heated fluid, and such means may comprise another valve or may include one or more tubes that may be included within or in conjunction with the pressure-tube by which fluid may be introduced into or circulated within or returned out of the pressure-tube.

In some embodiments, the pressure-tube (170) can be launched from an outlet aperture (182) of a launch chamber (180) and everted into the pipe (110) via fluid under pressure so that the pressure-tube can press the pipe-liner (130) against the pipe interior surface (114) being lined. The pressure-tube (170) can be launched from same launch chamber as that of the extended liner (150), or from another, separate launch chamber. In another embodiment, the pressure tube may be pushed into the pipe via elongated rods inserted into a pocket disposed on the pressure tube. In a further embodiment, the pressure-tube (170) may be dragged into the pipe by dragging means including, but not limited to, a cord or tape or rod attached to some attachment means including, but not limited to, loops, pockets, tapes, or eyelets attached to the pressure-tube. Alternatively or additionally, the pressure-tube may be pulled into the extended liner by pulling means such as, but not limited to, a rod, a cord, tape, a tube or other suitable elongated material or instrument and attachment means such as, but not limited to, a pocket or loop or eyelet or tape or tie or any combination of a pocket or loop or eyelet or tape or tie.

Figure 23:
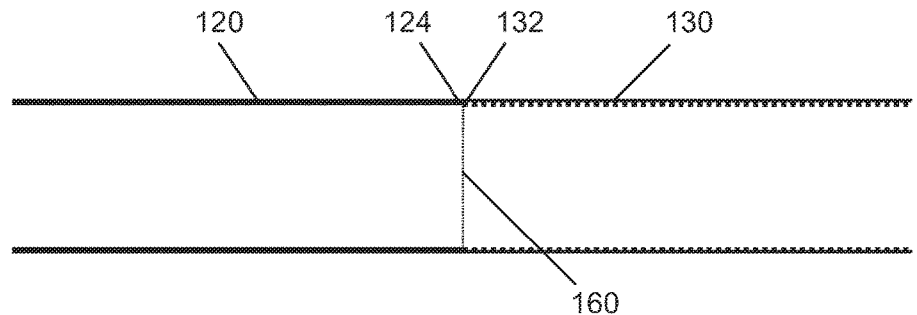
FIG. 23 shows another view of the pipe-liner connected to the extender-tube via an end-to-end butt joint.

FIG. 23 shows a non-limiting embodiment of the pressure-tube in lay-flat mode. It is depicted in exaggeratedly short form to aid the illustration. Both the proximal end and the distal end of the pressure-tube are sealed and a pressure-valve is incorporated into the proximal end through which pressurizing fluid may be introduced into and removed from the pressure-tube. In this example, a second, larger access valve is also provided suitable for introducing and removing heated water to accelerate liner curing. Means are provided for closing both valves, such as caps or plugs fitting on or in the valves, not shown in this figure. Loops are provided at the distal and proximal end of the pressure-tube to which a cord or rod may be attached or which may be attached to the second end of the pipe-liner so that the pressure-tube may be dragged in by a pipe-liner as it everts and a pocket is fitted into which a rod may be inserted for the purpose of pushing the pressure-tube into the pipe.

FIGS. 13 to 16 illustrate how the pressure-tube may be drawn into at least the pipe-liner by means of straps attached to the second end of the pipe-liner and then pressurized.

Figure 13:
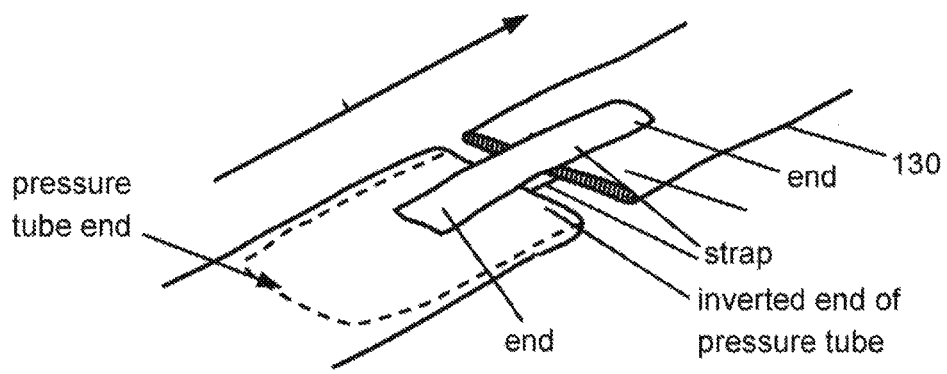
FIG. 13 shows the distal end of the pipe-liner connected to a pressure tube.

FIG. 13 shows the second end of the pipe-liner and the pressure-tube that is positioned in alignment with the pipe-liner and is connected to the pipe-liner by a pair of straps, one of which is attached to the underside of the pipe-liner and pressure-tube and consequently is largely concealed in this FIG. 13. The straps are connected to the pipe-liner by a connection at the distal end of each strap, and to the pressure-tube by a connection at the proximal end of each strap. The distal end of the pressure-tube is inverted and inserted into the main body of the pressure-tube and consequently is concealed and is shown in this FIG. 13 in dotted line and the visible end is the inverted end of the pressure-tube. When the pipe-liner is everted, the pressure-tube is drawn in progressively.

A strap may consist of more than one part which may be separable, such parts being combined or connected by, for example, a buckle to provide a sufficiently strong and flexible connection between the distal end of the pressure-tube and the second end of the pip-liner. In one embodiment, the proximal end of the strap or straps may be permanently attached to the pressure-tube. In another variant, a flexible sleeve is provided as an alternative to a strap or straps, the proximal end of which is attached to the distal end of the pressure tube, and the distal end of which is attached to the second end of the pipe-liner, the attachments to the pipe-liner and to the pressure-tube being optionally leak-proof.

Figure 14:
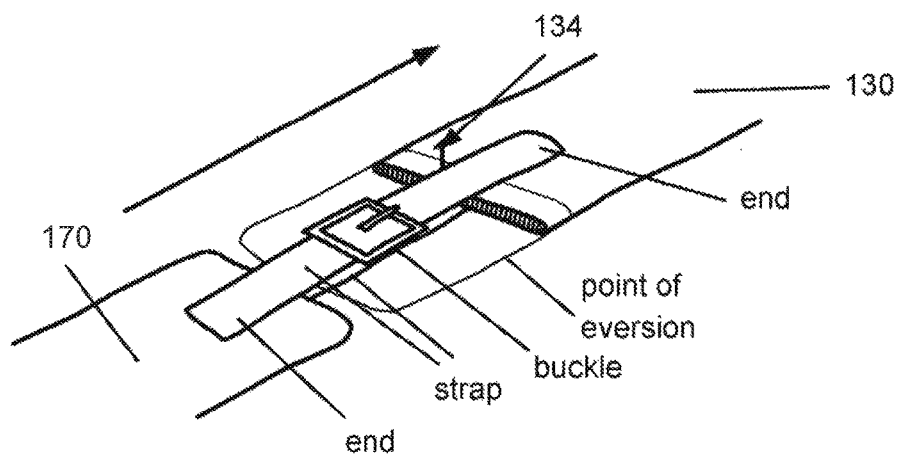
FIG. 14 shows a distal end of the pipe-liner attached to the pressure tube.

FIG. 14 shows the second end of the pipe-liner to which is attached a closure-sleeve. A pressure-tube is positioned in alignment with the pipe-liner and is connected to the pipe-liner by a pair of straps. The straps are each in two sections connected by a buckle. In this example, the proximal end of each strap is permanently attached to the pressure-tube and the distal end of each strap is attached to the pipe-liner by an adhesive so that it may readily be peeled away on completion of the installation of the pipe-liner. The distal end of the pressure-tube is inverted and inserted into the main body of the pressure-tube and consequently is concealed. When the pipe-liner is everted, the pressure-tube is drawn progressively into the pipe.

Figure 15:
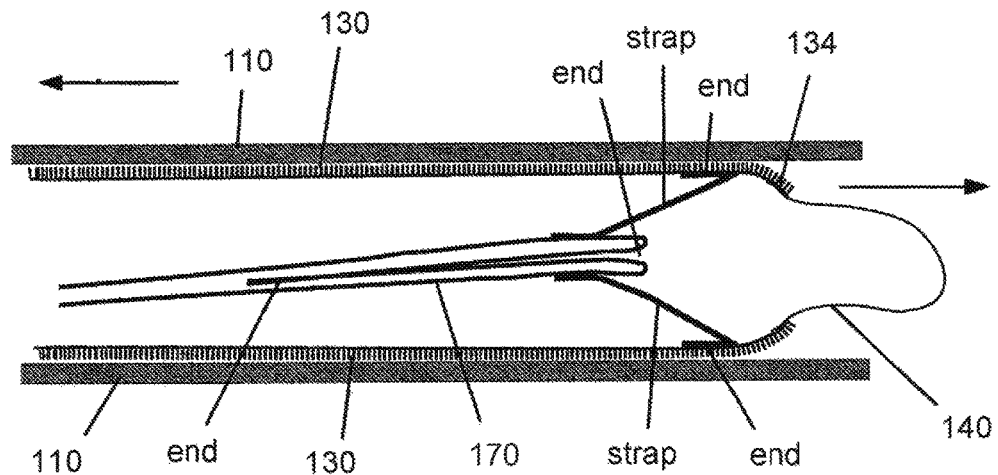
FIG. 15 shows a pipe-liner almost fully inverted into a pipe.
Figure 16:
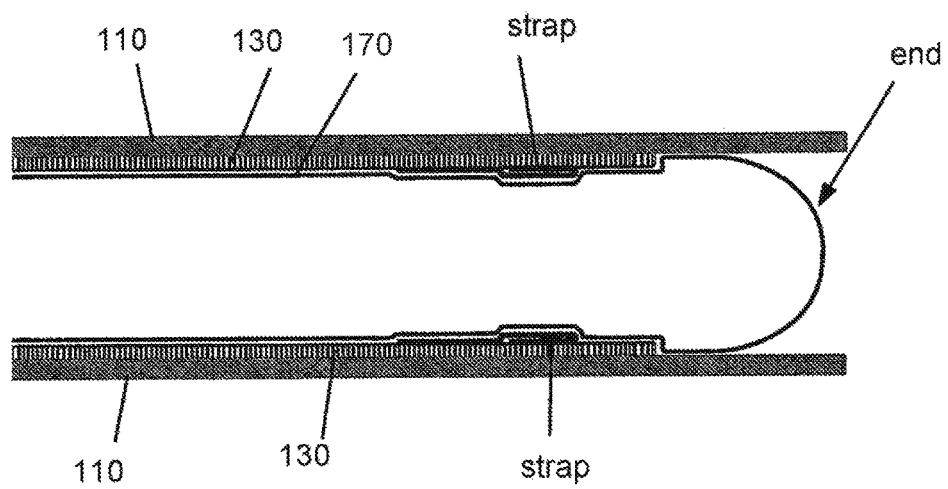
FIG. 16 shows a sectional view of a pipe-liner that is everted into a pipe and held static and pressed against the pipe interior via the pressure tube.

FIG. 15 shows in longitudinal cross-section the pipe-liner that is almost completely everted into a pipe. A closure-sleeve, which is attached to the end of the pipe-liner, is in process of everting and expanding under pressure of fluid. A pressure-tube where the distal end of which has been inverted and inserted into the body of the pressure-tube has been drawn into position by two straps, which are attached to the pressure-tube at the inverted end of the pressure-tube and to points on the inner surface of the pipe-liner, which are now stationary and which, prior to eversion, had formed the exterior surface of the liner. The distal ends of the straps have been turned through 180° so that, when a force is applied to the pressure-tube to withdraw it in a direction opposite of the direction of eversion (following completion of the lining process), the distal ends of the straps will be subjected to a peeling force in the same opposing direction. When fluid is introduced under pressure into the interior of the pressure-tube, the pressure-tube will expand to fill the pipe-liner and the distal end of the pressure-tube will evert and extend beyond the second end of the pipe-liner. FIG. 16 shows the pipe-liner positioned within the pipe and filled by the pressure-tube, the interior of which is filled with a pressurizing fluid which in this example is air. Two straps, which are joined to the pipe-liner and to the pressure-tube, are pressed between the inner surface of the pipe-liner and the outer surface of the pressure-tube. The distal end of the pressure-tube extends beyond the second end of the pipe-liner.

In other embodiments, a retrieval cord or tape may be attached to the proximal end of a pressure-tube for retrieving the pressure-tube where direct access to the proximal end of the pressure-tube is not available, for example, where the extended liner being pressurized is located in the pipe at some distance from the access end of the pipe. In still other embodiments, an extension fluid-feed tube may be attached to the proximal end of a pressure-tube for introducing fluid into and removing fluid from the interior of pressure tube, particularly where direct access to the proximal end of the pressure-tube is not available.

In further embodiments, the system may also include a loader-packer in the form of a container or pallet into which, or onto which, the extended liner and any drag-cord and any pressure-tube that may be directly or indirectly attached to them may be wholly or partly loaded, which may then be loaded or inserted into the launch chamber. The pallet may conveniently be rectangular and of such dimensions that the whole or part of the extended liner and any drag-cord and any pressure-tube that may be directly or indirectly attached to them may be folded in loops and placed on it and it may have one or more substantially vertical sides which may be removable. The container may conveniently be formed with a rectangular base and be of such dimensions that the whole or part of the liner or the extended liner and any drag-cord and any pressure-tube that may be directly or indirectly attached to them may be folded in loops and placed in it. The container may be fully enclosed by substantially vertical sides or may be partially enclosed and may be wholly or partly closed by a closure such as a lid or cover and may be of a form such that a fluid (e.g. lubricant) may be introduced into it without significant leakage or spillage. The container may be of rigid construction or of a flexible material in the form of a wrapper or bag and may be configured so that it may be wholly or partly removed from the launch chamber before the launch chamber is closed in readiness for everting the extended liner.

A non-limiting method for loading the extended liner and any drag-cord and any pressure-tube that may be directly or indirectly attached to them onto or into a loader-packer, and then loading or inserting them into the launch chamber, is to fold them in loops with the first end of the extender-tube uppermost and with the remaining part of the part of the extended liner underneath, and then any drag-cord and any pressure-tube that may be directly or indirectly attached to them positioned successively underneath the extended liner. The extended liner and any drag-cord and any pressure-tube that may be directly or indirectly attached to them are placed into or onto a loader-packer and may conveniently be inserted directly into the launch chamber. The arrangement of the extended liner and any drag-cord and any pressure-tube that may be directly or indirectly attached to them and the loader-packer is such that the extended liner and any drag-cord and any pressure-tube that may be directly or indirectly attached to them may be readily drawn off progressively as the extended liner are everted. A lubricant may applied to the any part of the extended liner to facilitate eversion, as well as to any drag-cord or pressure-tube or other item that may be attached.

Figure 17:
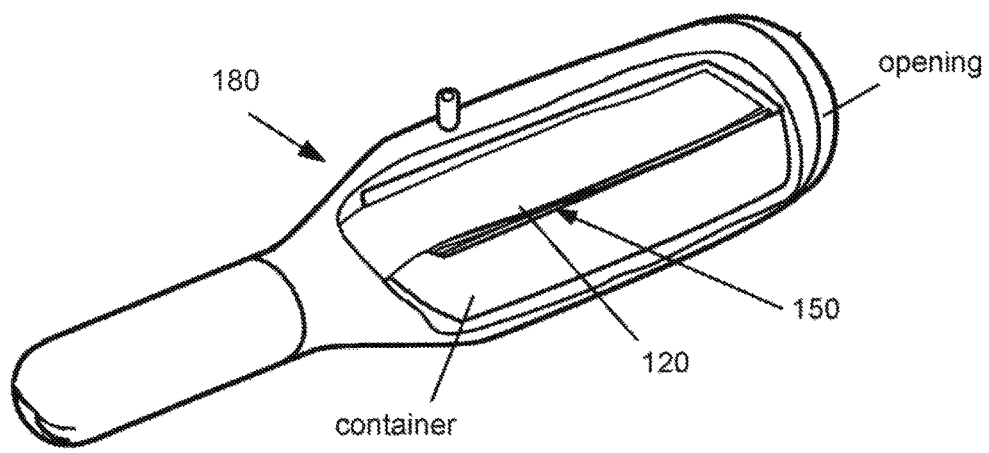
FIG. 17 shows a cut-away section of the launch chamber showing the extended liner placed in a container.
Figure 18:
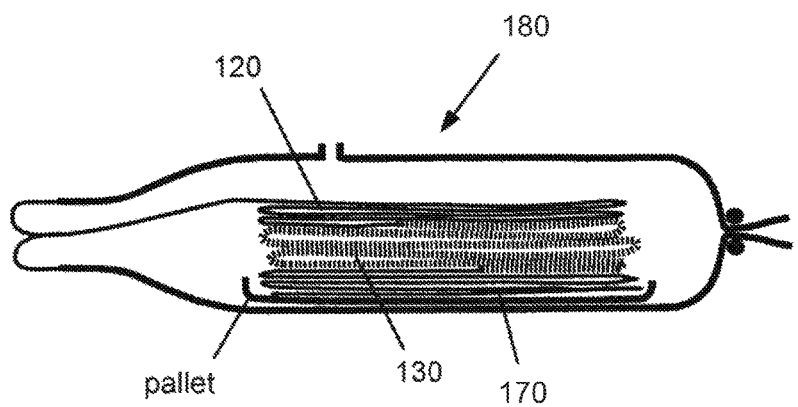
FIG. 18 shows a section view of the extender-tube and the pipe-liner to which a pressure tube is attached.
Figure 19:
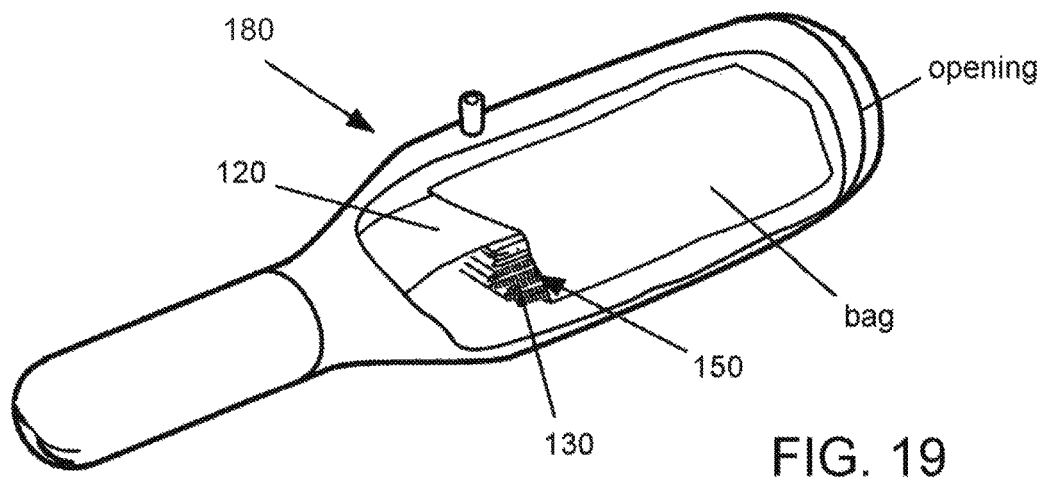
FIG. 19 shows a view of the launch chamber having a cut-away section showing the extended liner placed in a bag.

FIGS. 17, 18 and 19 show non-limiting examples of launch chamber and loader-packer that may be used to aid loading the extended liners, pressure-tubes and ancillary items into the pressurizable chambers.

In FIG. 17, which provides a cut-away view to reveal the interior of the launch chamber, an extended liner is folded in loops and placed within a container. The extended liner may be loaded into the container while outside the launch chamber and then the container with the extended liner inside may be loaded into the launch chamber through the opening at the loading end of the launch chamber, which may then closed by a closure. In this example, only the extender-tube part of the extended liner is visible, and the pipe-liner part and any attached additional items, such as a pressure-tube, are positioned below the extender-tube and out-of-sight in the container. The container is configured to allow the extended liner and the pressure-tube to unfold progressively as they evert and extend.

FIG. 18 shows in longitudinal section the extender-tube and the pipe-liner to which the pressure-tube is attached, all folded in loops and loaded onto a pallet, which in turn has been loaded into the launch chamber. FIG. 19 provides a cut-away view to reveal the interior of the launch chamber in which an extended liner is folded in loops and contained within a bag. The bag is configured to allow the extended liner to unfold progressively as it everts and extends.

In preferred embodiments, the extender-tube may be attached to the pipe-liner directly by any effective means. For example, as shown in FIG. 23, the removable, substantially leak-proof connection may be an end-to-end butt join where the extender-tube second end (124) abuts and is connected to the pipe-liner first end (132).

Alternatively, the removable, substantially leak-proof connection (160) may comprise a flexible intermediate collar or connector sleeve (165). Preferably, the intermediate collar or connector sleeve may be also be elastic and impermeable. Without wishing to be bound by a particular mechanism, this flexibility and elasticity of the intermediate collar or connector sleeve can accommodate the circumferential difference between the extender-tube and the pipe-liner, as well as tolerate any changes in the circumference when the extender-tube and the pipe-liner are everted and what was once the outer surface of the extended liner becomes the inner surface, which will have a smaller circumference.

Figure 24:
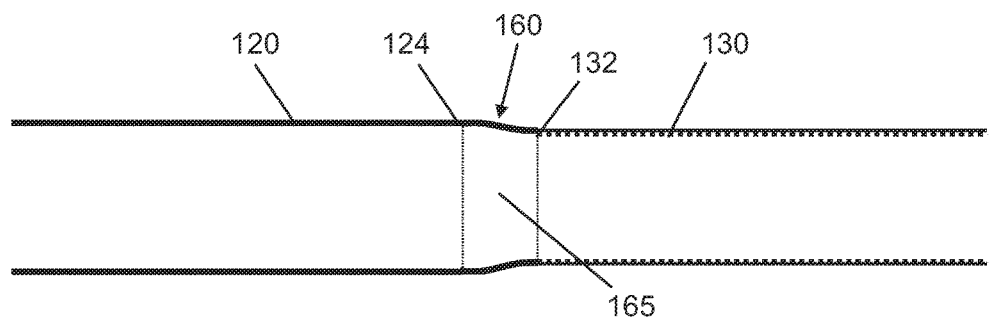
FIG. 24 shows another view of pipe-liner connected to the extender-tube via a tapered intermediate collar or connector sleeve.

In one embodiment as shown FIG. 24, the intermediate collar or connector sleeve (165) can have a connection first end (162) that is welded to the extender-tube second end (124), and a connection second end (164) that is adhered to the pipe-liner first end (132). In this embodiment, the connection first end (162) and the extender-tube second end (124) forms an end-to-end butt join. The connection second end (164) and the pipe-liner first end (132) also forms an end-to-end butt join.

Figure 22:
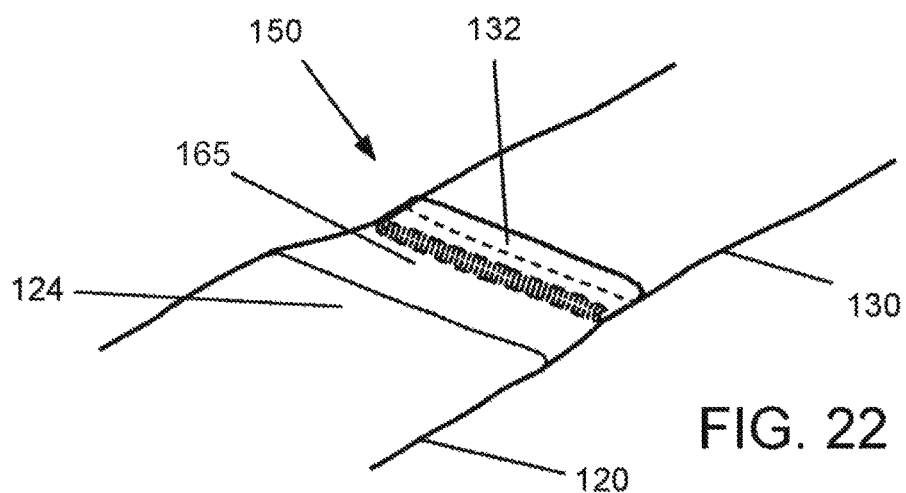
FIG. 22 shows a close-up view of the pipe-liner connected to the extender-tube via a tapered intermediate collar or connector sleeve. Without wishing to be bound by a particular mechanism, the tapered intermediate collar or connector sleeve can accommodate the difference between the circumference of the extender-tube and the pipe-liner. Further still, an elastic collar may be used to accommodate the change in circumference of the extender-tube and the pipe-liner skin when they are everted.
Figure 25:
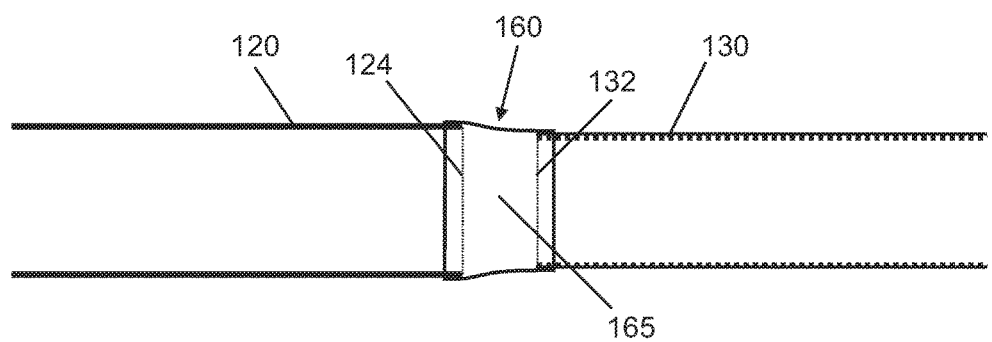
FIG. 25 shows another view of pipe-liner connected to the extender-tube via the tapered intermediate collar or connector sleeve with overlapping joints. In an exemplary embodiment, the extender-tube/collar joint may be welded and the collar/pipe-liner joint may be adhered together via an adhesive.
Figure 26:
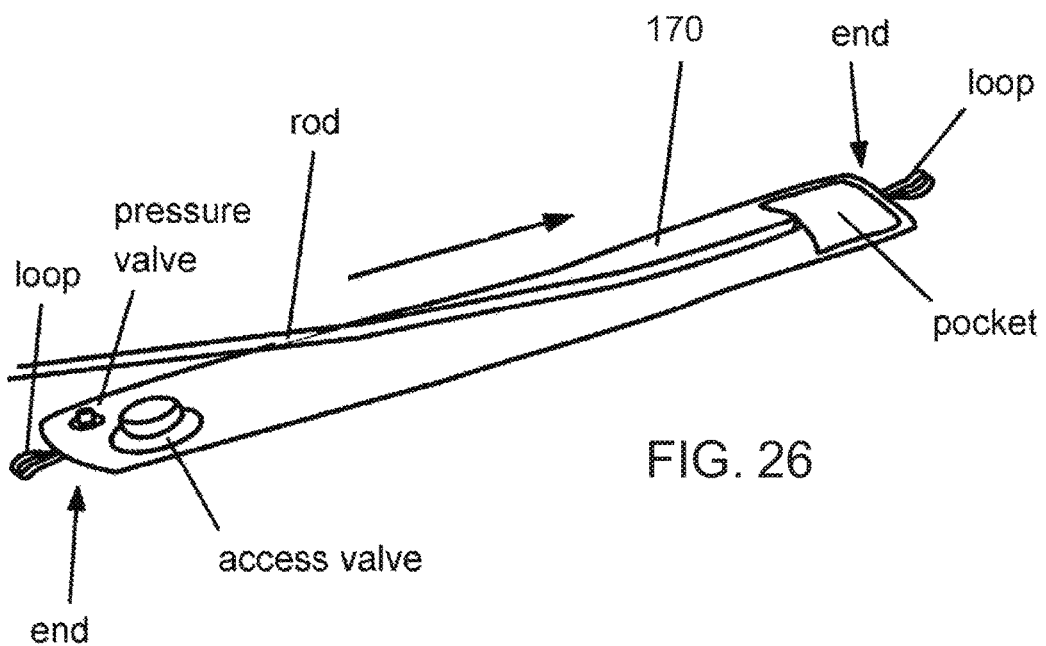
FIG. 26 shows a pressure tube in lay-flat mode. Loops may be provided at the distal and proximal ends of the pressure tube to which a cord or rod may be attached or which may be attached to a closure-sleeve or other attachment at the distal end of the pipe-liner so that the pressure-tube may be dragged in by the liner as it everts. A pocket may be disposed at an end of the pressure tube into which a rod may be inserted for the purpose of pushing the pressure-tube.

In another embodiment as shown FIG. 22, the pipe-liner is connected to the extender-tube by means of an intermediate connector-sleeve, which is tapered to accommodate the different circumferences of the extender-tube and pipe-liner. The extended liner is shown in lay-flat mode and the differences in circumference are shown by the different lay-flat widths. The connector-sleeve overlaps the first end of the pipe-liner and is joined to it in a manner that allows it to be readily removed when curing of the hardenable fluid is complete. FIG. 25 shows another alternative embodiment where the connection first end (162) overlaps the extender-tube second end (124) and is joined to it in a fixed manner, and the connection second end (164) overlaps the pipe-liner first end (132) and is joined to it in a manner that allows it to be readily removed when curing of the hardenable fluid is complete.

In some embodiments, the extender-tube (120) may be detached from the pipe-liner (130) upon application of a pulling force to the extender tube (120) such that the connection second end (164) is disconnected from the pipe-liner first end (132). This pulling force is generally in a direction directly opposing the progressive direction. Without wishing to be bounded by a particular mechanism, the extender-tube second end (124) may be directly broken off from the pipe-liner first end (132); or the connection (160), while remaining connected to the extender-tube, may be broken off or peeled away from the pipe-liner. For example, in the case of the end-to-end butt join, the connection second end (164) is detached from the pipe-liner first end (132). When the ends are overlapping, the connection second end (164) may be peeled away from the pipe-liner first end (132).

In some embodiments, a suction can be used to draw resin through a liner when it is impregnated. Accordingly, and to aid the process of impregnation, a suction-valve is provided, fitted either at the pipe-liner first end or at the extender-tube second end or on the connector-sleeve, through which air may be drawn to create a partial vacuum within the pipe-liner so that resin introduced into the pipe-liner is drawn through and impregnates the pipe-liner. Sealing means are provided whereby the extender-tube is sealed to prevent air from passing through it to the suction-valve and such means include, but are not limited to, the materials of extender-tube or connector-sleeve or both being of a nature such that the inner surfaces of the extender-tube or connector-sleeve or both are drawn together in a sealing manner when suction is applied, or a clamp or clamps or a seal such as a tape over the extender-tube aperture or a coating or band of sealant material applied or attached to the inner surface of the extender tube, or a combination of these means. The sealing means can be removable or of a nature and dimensions that permit the extended liner to be everted after impregnation is completed.

The application of suction to a suction-valve fitted to the extender-tube or to the connector-sleeve, if used, may cause the extender-tube and the connector-sleeve, which are in substantially lay-flat mode prior to impregnation of the pipe-liner, to collapse so that the inner surfaces are drawn tightly together, thus restricting or even preventing the passage of air out of the pipe-liner into the extender-tube or connector-sleeve or both. In order to overcome this, separation means are provided for separating the inner surfaces of the extender-tube or connector-sleeve or both to allow the passage of air from the pipe-liner to the suction-valve, such separation means including, but not limited to, a tube or a separator that is sufficiently porous to allow the passage of air through the body of said separator when it is positioned within an extender-tube or connector-sleeve or both, between the pipe-liner and the suction-valve. In a preferred embodiment, the separator comprises a porous pad of a material or materials through which air will readily pass such as sponge or felt.

Figure 20:
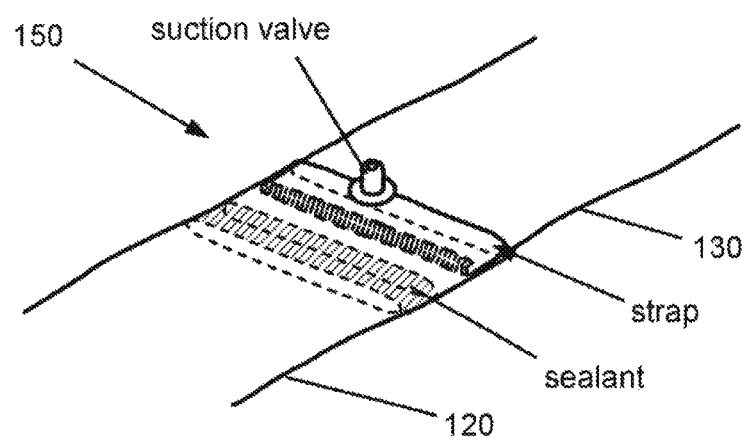
FIG. 20 shows a close-up view of the pipe-liner connected to the extender-tube.

FIG. 20 depicts a section of the extended liner where the pipe-liner is connected to the extender-tube. A suction-valve is fitted to the first end of the pipe-liner and a band of sealant material is attached to the inner surface of the extender-tube. Broken line has been used to depict features and edges of features that are located below the upper surface of the pipe-liner and extender-tube. In this example, the opposing faces of the band of sealant material will need to be pressed together to achieve a seal. Suction applied through the suction-valve causes resin to be drawn through the pipe-liner.

Figure 21:
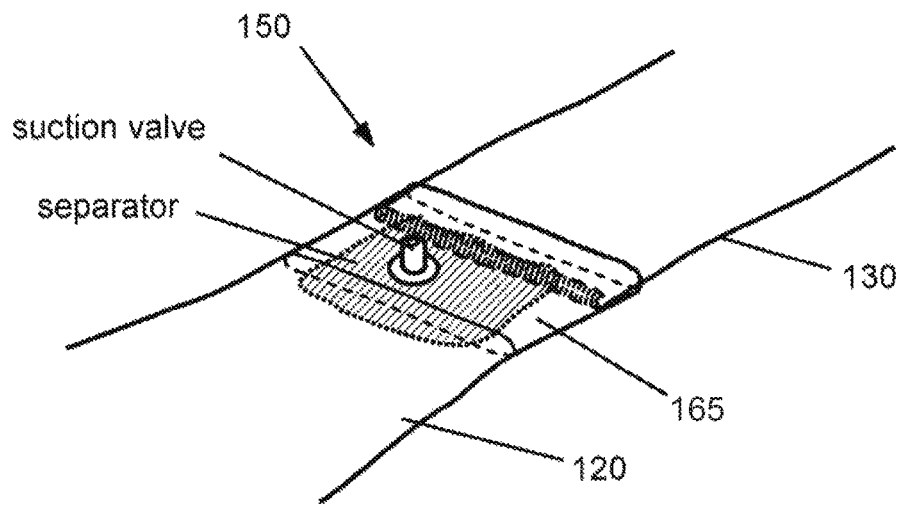
FIG. 21 shows a close-up view of the pipe-liner connected to the extender-tube via an intermediate collar or connector sleeve.

FIG. 21 depicts a section of the extended liner where the pipe-liner is connected to the extender-tube by a connector-sleeve. The extender-tube is tapered to match the dimensions of the connector-sleeve. A suction-valve is fitted to the connector-sleeve. A separator is positioned inside the connector-sleeve and against the end of the pipe-liner, providing a path through which air may pass from the pipe-liner into the suction-valve to create a partial vacuum and draw resin into the pipe-liner. Broken line has been used to depict features and edges of features that are located below the upper surface of the liner and extender-tube.

In alternative embodiments, a substantially leak-proof, pressure-retaining closure-sleeve (140) may be removably disposed on the pipe-liner second end (134). The closure-sleeve (140) can enclose the pipe-liner second end (134), thus maintaining pressure in the extended liner (150) after eversion. The closure-sleeve is preferably of a flexible, impermeable material and provides a substantially leak-proof seal at the pipe-liner second end and is preferably configured so that it will evert and serve to ensure that the pipe-liner second end fully everts, as well as allowing the pipe-liner to conform to the interior surface of the pipe in which it is positioned.

The closure-sleeve may be of a circumference similar to that of the outer surface of the pipe-liner and is positioned so that one part of it encloses pipe-liner second end and the other part projects beyond the pipe-liner second end. The part of the closure-sleeve that encloses the pipe-liner second end is attached to the pipe-liner and the distal end of the closure-sleeve is closed so that the closure-sleeve forms a closure over the pipe-liner second end which, when the pipe-liner is fully everted, provides a substantially leak-proof pressure-retaining closure. A closure-sleeve may be fabricated from a sheet of suitable material, wrapped to form a tube and closed or sealed at the seam and distal end.

In some embodiments, the distal end of a closure-sleeve is initially open, providing an aperture through which material such as resin may be introduced into the pipe-liner. The open-ended closure-sleeve may subsequently be closed to provide a closure that is substantially leak-proof and pressure-retaining by closing means including, but not limited to, sealing with adhesive or tape or by welding or binding or by applying a clamp or collar or other mechanical device, or incorporating an ancillary device including, but not limited to, an access valve or aperture or an anchor-point in the closure.

In other embodiments, a cord or other suitable elongated flexible material, hereinafter referred to as a drag-cord, may be attached by one end to the closure-sleeve or by other suitable attachment to the pipe-liner second end prior to everting the extended liner, and the other end of the drag-cord may be anchored or otherwise caused to remain positioned at a suitable location close to the first end of the extender-tube, or to the first end of the pipe-liner if no extender-tube is used, so that the eversion process causes the drag-cord to be drawn through the extended liner.

In a preferred embodiment, the closure-sleeve is attached to the pipe-liner second end by a means of attachment that readily allows the user to remove it together with any attachment material or part following the completion of the process of positioning the liner or the hardening or curing of the pipe-liner. The closure-sleeve may be removed from the pipe-liner second end by peeling or otherwise breaking off the closure-sleeve and any attachment material or intermediate part, releasing by dissolving or washing away or heating the closure or attachment or any adhesive or sealant, and bursting or other mechanical destruction. For example, the closure-sleeve may be removed by applying a pulling force to the proximal end of the drag-cord or other elongated part that is attached to the closure-sleeve in a manner such that the closure-sleeve may be drawn towards the first end of the pipe-liner and peeled or broken off or otherwise detached from the pipe-liner.

Figure 11:
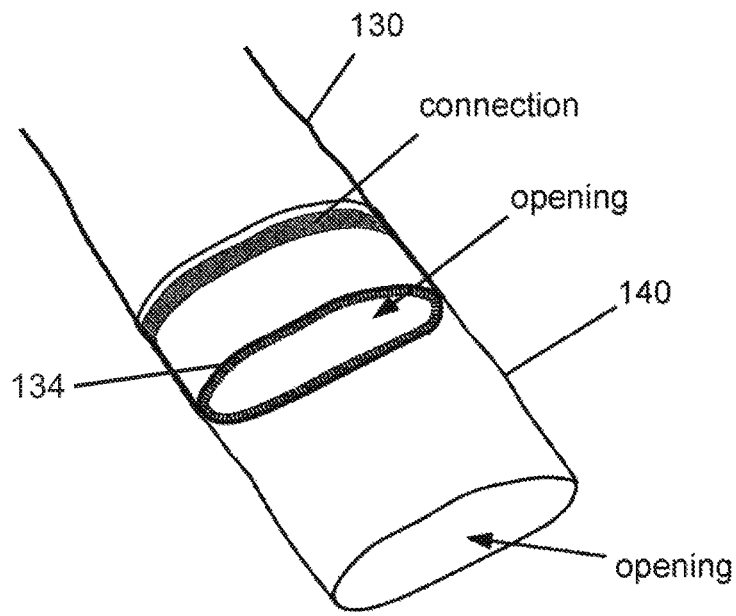
FIG. 11 shows a closure-sleeve fitted around a distal end of the pipe-liner.

FIG. 11 shows in general view a closure-sleeve attached to the pipe-liner by a connection. The closure-sleeve encloses the opening at the second end of the liner and the opening at the end of the closure-sleeve provides access whereby materials such as resin may be introduced into the liner.

Figure 12:
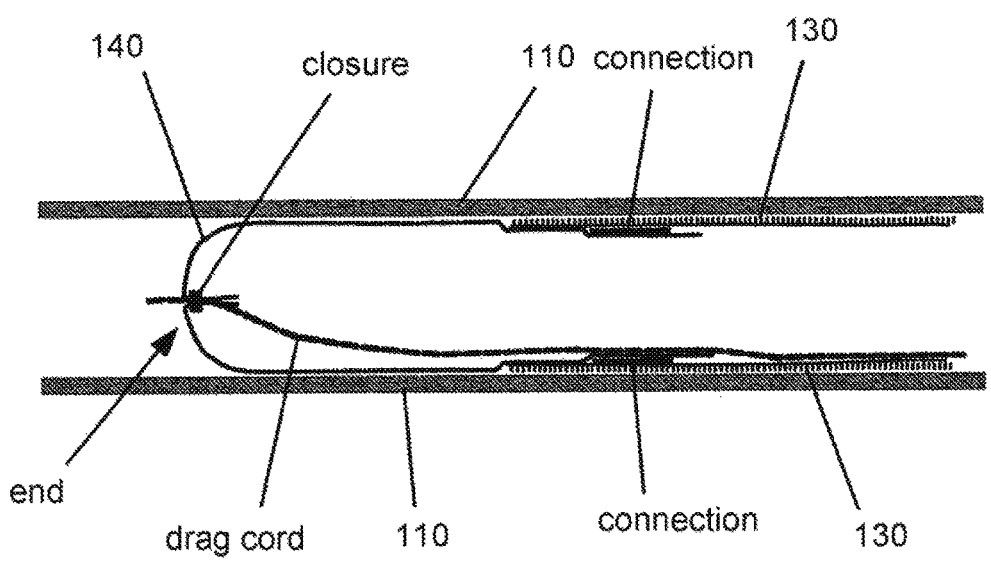
FIG. 12 shows a sectional view of the pipe-liner and the closure-sleeve after being everted.

FIG. 12 shows in longitudinal sectional view the pipe-liner second end following the completion of eversion of the pipe-liner into a pipe. The closure-sleeve is attached to the inner surface of the pipe-liner by a connection. The distal end of the closure-sleeve is closed by a closure which, in this example, is in the form of a binding and the interior of the pipe-liner is pressurized by the pressurizing fluid. A drag-cord is attached to the closure and, having been drawn in by the eversion process, extends through the full length of the extended liner (only the distal end of the drag-cord is shown).

According to another embodiment, the present invention features a method of lining a pipe. The pipe may comprise a pipe opening end (112) fluidly connected to a pipe interior surface (114). In one embodiment, the method may comprise providing an eversible extended liner (150) consistent with previously described embodiments. For instance, the extended liner (150) may comprise an eversible, substantially-impermeable, elongate, extender-tube (120) having an extender-tube first end (122), an extender-tube second end (124), and a selectable extender-tube length measured from the extender-tube first end (122) to the extender-tube second end (124); and an eversible, flexible, elongate, tubular, pipe-liner (130) having a pipe-liner first end (132), a pipe-liner second end (134), and a selectable pipe-liner length measured from the pipe-liner first end (132) to the pipe-liner second end (134). The extender-tube second end (124) may be connected to the pipe-liner first end (132) via a removable, substantially leak-proof connection (160) such that the combined extender-tube (120) and the pipe-liner forms a single, continuous eversible tube, referred to as the extended liner (150).

In another embodiment, the method may further comprise choosing the extender-tube length so that the pipe-liner (130) is caused to be accurately positioned within the pipe (110) upon eversion into the pipe (110), choosing the pipe-liner length so that the pipe-liner (130) is caused to be accurately positioned within the pipe (110) upon eversion into the pipe (110), placing the extender-tube first end (122) exterior to the pipe (110) at a predetermined position from the pipe opening end (112) so that the pipe-liner (130) is caused to be accurately positioned within the pipe (110) upon eversion into the pipe (110), and everting the combined extender-tube (120) and pipe-liner (130) via fluid under pressure that has been introduced into an interior of the extended liner (150) to drive at least part of the eversion process of the extended liner (150) progressively into the pipe.

Without wishing to be bound to a particular mechanism, the extended liner (150) can be everted such that the extender-tube (120) is first to evert and drags the pipe-liner (130) through the everted extender-tube (120), the pipe-liner (130) then everts after eversion of the extender-tube (120) is completed, and the pipe-liner (130) becomes positioned at a desired position within the pipe (110) via the selected predetermined extender-tube length, the selected predetermined pipe-liner length, and the placement of the extender-tube first end (122) exterior to the pipe (110) at the predetermined position from the pipe opening end (112). In other embodiments, the length of the extender-tube (120) and that of the pipe-liner (130) are chosen so that the pipe-liner (130) is caused to be accurately positioned within the pipe (110) with one or both of the ends of the pipe-liner (130) placed at predetermined positions. In some preferred embodiments, the pipe-liner (130) becomes positioned at the desired position within the pipe (110) such that the pipe-liner lines at least a defective section of the pipe (110) when everted.

In other embodiments, the extended liner (150) may be loaded into a launch chamber (180) having an outlet aperture (182). For example, a portion of the extender-tube (120) at the extender-tube first end (122) is disposed through the outlet aperture (182), everted, and connected back to the outlet aperture (182). The launch chamber (180) is then positioned exterior to the pipe (110) such that outlet aperture (182) is adjacent to the pipe opening end (112), and the pressurized fluid is introduced into an interior (184) of the launch chamber to drive at least part of the eversion of the extended liner (150) progressively into the pipe (110).

In one embodiment, the pipe-liner (130) may comprises a tube of an absorbent material (136) impregnated with a hardenable fluid. The pipe-liner (130) may also have an impermeable plastic skin (138) that forms an exterior surface of the pipe-liner (130) prior to eversion, and when the pipe-liner (130) is everted, the impermeable plastic skin (138) forms an interior surface of the pipe-liner (130) and the absorbent material (136) interfaces with the pipe interior surface (114).

In some embodiments, the method may further comprise hardening the hardenable fluid after everting the extended liner (150). The fully everted pipe-liner (130) may be supported against the pipe interior surface (114) being lined while the hardenable fluid is hardening. In one embodiment, the supporting step may comprise inserting a pressure-tube (170) of a flexible material into the pipe (110) such that the pressure-tube (170) is positioned at least along the length of the pipe-liner, and filling the pressure-tube (170) with fluid under pressure so that the pressure-tube presses the pipe-liner (130) against the pipe interior surface (114) being lined. In another embodiment, the supporting step may further comprise launching the pressure-tube (170) of a flexible material from an outlet aperture (182) of a launch chamber (180), and everting said pressure-tube (170) into the pipe (110) via fluid under pressure such that the pressure-tube presses the pipe-liner (130) against the pipe interior surface (114) being lined. In preferred embodiments, the pressure-tube is substantially hermetically sealed during the supporting step so as to maintain sufficient pressure within the pressure-tube.

In an alternative embodiment, the pressure-tube (170) may be dragged into the pipe. For example, a first end of the pressure-tube is removably attached to the pipe-liner second end (134) so that the pressure-tube is dragged into the pipe-liner (130) as the pipe-liner (130) everts. During filling of the pressure-tube with pressurized fluid, the pressure-tube becomes inflated presses against the entire length of the pipe-liner (130), thereby sandwiching the pipe-liner (130) between the pipe interior surface (114) and the pressure-tube. In further embodiments, the pressure tube may be pushed into the pipe via elongated rods.

In further embodiments, the method may comprise detaching the extender-tube (120) from the pipe-liner (130) via the removable, substantially leak-proof connection (160) and removing the detached extender-tube (120) from the pipe (110). In some instances, this step of detaching is performed after the hardenable fluid has sufficiently hardened to withstand the force required to detach extender-tube and hold the pipe-liner is in place within the pipe.

In some embodiments, the removable, substantially leak-proof connection (160) may be a flexible intermediate collar or connector sleeve (165) connecting the extender-tube second end (124) to the pipe-liner first end (132). The extender-tube (120) may be detached from the pipe-liner (130) by detaching the intermediate collar or connector sleeve (165) from the pipe-liner first end (132).

In one embodiment, the intermediate collar or connector sleeve (165) may be welded to the extender-tube second end (124), thereby forming a fixed, substantially leak-proof joint. In another embodiment, the intermediate collar or connector sleeve (165) may be adhered to the to the pipe-liner first end (132) via an adhesive, thereby forming a removable, substantially leak-proof joint that enables detachment of the intermediate collar or connector sleeve (165) from the pipe-liner first end (132) upon application of a pulling force to the extender tube (120).

Comparison to U.S. Pat. No. 6,199,591, Kiest et al.: The feature of a length of the extender-tube and a length of the liner are chosen so that the liner is be caused to be accurately positioned within the pipe is critical in this invention because the present system (100) can place the liner from a single access opening by using predetermined lengths of the extender-tube and liner, in contrast to the Kiest invention, which is dragged into position with a rope or cord. The Kiest prior art does not have the feature of a length of the extender-tube and a length of the liner are chosen so that the liner is be caused to be accurately positioned within the pipe. At most, this prior art has a length that is not critical in determining placement of the liner, which cannot achieve the critical function of the feature in the presently claimed invention.

Additional features of distinction may be summarized as 1) the leak-proof connection (160) between the extender-tube (120) and the pipe-liner (130); 2) the method whereby the extender-tube (120) and pipe-liner (130) are caused to evert; and 3) the movement of the extender-tube (120) and the pipe-liner (130) towards the point where they evert.

FIG. 9 of U.S. Pat. No. 6,199,591, Kiest et al. shows one end of the device for installing a section of liner at a pre-determined position within a sewer. On the left, there is a pair of end-flaps through which is threaded a cable which is used to haul the device into place within a sewer. The other parts depicted in FIG. 9 are for use once the device has been positioned inside the sewer. An outer carrier tube 82 (col 8, line 29) is shown, integrally formed with a bladder tube (col 8, line 30) with a juncture between the two at a fold (col 8, line 37), An inversion collar is spot welded or otherwise attached to the forward end of bladder tube and extends rearwardly therefrom. At its rear end it is attached to a repair sleeve by means of threads (col 8, lines 41 to 44 verbatim).

Not labeled in FIG. 9 but identified in FIG. 5 of Kiest et al. is the carrier cavity (col 6, line 44), which is referred to again in relation to FIG. 11, though it is also not actually marked on FIG. 11. Although not explicitly shown in FIG. 9, the bladder tube is closed hermetically at the unseen end (see FIGS. 6, 7 and 8 and reference to plug in col 9, line 28), so any fluid introduced into the carrier cavity will be retained between the outer carrier tube and the bladder tube and, since fold is the only unconstrained part of the enclosure of the carrier cavity, pressurizing it will cause the bladder tube to evert. At the same time, pressure within the carrier cavity will cause the bladder tube to collapse around the inversion collar and the repair sleeve and will drive out any air that is in the space that encloses them. The repair sleeve and the inversion collar are pressed within and gripped by the enclosing bladder tube so that they advance exactly together with it towards the point where they are carried round on the outside of the everting part of the bladder tube and, having been everted, are then pressed against the inner surface of the pipe being lined. During this process, the pressurizing fluid is at all times held within the carrier cavity and the inversion collar and the repair sleeve are both positioned on the other side of the containing wall of the bladder tube; they do not come into contact with the pressurizing fluid at any time and the join that connects them is not subjected to any potentially destructive stress during the process. There is therefore no requirement for the join to be leak-proof or for it to be strengthened to withstand being everted and the purposely breakable connection formed of threads is sufficient for the purpose of ensuring that the repair sleeve follows the inversion collar and everts satisfactorily.

Kiest et al. explains the eversion process in the following terms, all of which describe the bladder tube as the prime component being inverted (everted), resulting in the repair sleeve/liner being placed in the desired position in the pipe being lined: Abstract: "The bladder tube can be inverted out of the carrier tube so as to place the repair sleeve in contact with an area to be repaired within a sewer pipe.", Column 2, lines 55 to 61: " . . . the positioning element then being inserted into an existing pipe and fluid being introduced under pressure into the positioning element to cause the inflation bladder and the liner secured thereto to invert outwardly from within the positioning element to a placement position near the compromised pipe section . . . ", Column 3, lines 41 to 45: "When the carrier is located next the area in the pipeline to be repaired, the bladder tube is inverted out of the carrier tube and this places the resin impregnated material in contact with the sewer walls needing repair.", Column 7, lines 56 to 62: "When the carrier tube reaches the position shown in FIG. 11, air pressure, water pressure or other fluid pressure is applied to the carrier cavity. This causes the bladder tube to begin to invert out of the carrier tube in the manner illustrated in FIG. 12. The inversion of the bladder tube continues until it reaches the position shown in FIG. 13. In this position the repair sleeve is on the outside of the bladder tube and is in engagement with the area of pipe which requires repair."

FIG. 5 of Kiest et al. shows an alternative form of the device. It is very similar to the device depicted in FIG. 9, except that a set of rigid collars and rings is used for clamping some of the main components together. A serrated collar and an outer clamp, trap and hold in position the rear ends of the end flaps and the forward end of the carrier tube. The forward end of bladder tube is folded back over the forward end of collar and secured with a clamp. Although part of bladder tube is depicted as touching the inner surface of collar, these two components are not attached and the carrier cavity extends forward of collar, and thus the bladder tube is capable of eversion and carrying and everting the inversion collar and the repair sleeve in the same manner as in FIG. 9.

Some of the workings of the Kiest device can be seen at http://vimeo.com/48085881. The relevant segments start at 02.43 with the assembled device being loaded from a truck into a flexible tube that seems to serve as a protector and guide for inserting it into a manhole. At 03.08, the device is shown being dragged within a pipe. The circular appearance indicates that it is the FIG. 5 version with a rigid collar. The commencement of eversion is at 03.13 but the following few seconds, which include both the emergence and the withdrawal of the inner bladder, pass too quickly for one to get a clear picture of what is going on.

Thus, the combination of an inversion collar connected to a repair sleeve as described by Kiest et al. in U.S. Pat. No. 6,199,591 differs from the combined extender-tube (120) and pipe-liner (130) that forms a continuous, substantially leak-proof tubular construction that is claimed in the present invention. The method of attachment of the inversion collar to the repair sleeve is described as being by threads or stitches that are easily broken and they are depicted as loose, looping above the surface of the materials being attached. If used on the device in the present invention, such a connection would fail to retain the pressures used to drive eversion and even minor leakage holes would cause loss of pressure sufficient to halt the process.

Kiest et al. consistently describes the pressurization and eversion process in terms of the behavior of the bladder tube and barely touch on the behavior of the eversion collar and the repair sleeve other than to say that the repair sleeve is secured to the bladder and is placed against the damaged part of the pipe being lined. It is clear that the carrier cavity, bounded by the bladder tube and the outer carrier tube, fully encloses the pressurizing fluid and that the repair sleeve and the inversion collar lie outside it and so do not come into contact with the pressurizing fluid. Thus, the eversion of the repair sleeve and the inversion collar is driven by the eversion of the bladder tube and there is no need for the join between the two components to be leak-proof or strong. In contrast, there is no intermediate bladder in the present invention that takes the load due to the fluid pressure nor separates the liner and the extender-tube (120) from the pressurizing fluid, thus, the join between them is required to be substantially leak-proof and strong enough to withstand the process of eversion without loss of pressure.

As explained above, prior to eversion, the repair sleeve and inversion collar in the Kiest device (pipe-liner (130) and extender-tube (120) in the present invention) are held within the uneverted section of the bladder tube which, when subjected to pressure, collapses tightly round them so that there is no possibility that they might be caused to move independent of the bladder tube by a dragging force applied to one end. Then, as the bladder tube everts, the repair sleeve and inversion collar are carried forwards by the motion of the bladder tube, the force being exerted on the repair sleeve frictionally along its entire length, not as a dragging force exerted by the inversion collar. In contrast, the device in the present invention relies on dragging forces exerted directly on the extender-tube (120) and liner from the point where they evert and, unlike the Kiest device, requires joins capable of withstanding such forces.

As used herein, the term "about" refers to plus or minus 10% of the referenced number.

The disclosures of the following U.S. patents are incorporated in their entirety by reference herein: U.S. Pat. No. 6,199,591, U.S. Pat. No. 5,044,405, U.S. Pat. No. 5,407,630, and U.S. Patent Pub. No. 2008/0236692.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of lining a pipe having a pipe opening end (112) fluidly connected to a pipe interior surface (114), said method comprising:
   a. providing an eversible extended liner (150), said extended liner (150) comprising:
      i. an eversible, substantially-impermeable, elongate, extender-tube (120) having an extender-tube first end (122) and an extender-tube second end (124), wherein a selectable extender-tube length is measured from the extender-tube first end (122) to the extender-tube second end (124); and
      ii. an eversible, flexible, elongate, tubular, pipe-liner (130) having a pipe-liner first end (132) and a pipe-liner second end (134), wherein a selectable pipe-liner length is measured from the pipe-liner first end (132) to the pipe-liner second end (134), wherein the extender-tube second end (124) is connected to the pipe-liner first end (132) via a removable, substantially leak-proof connection (160), wherein the combined extender-tube (120) and the pipe-liner (130) form a single continuous eversible tube, referred to as the extended liner (150);
   b. choosing the extender-tube length so that the pipe-liner (130) is caused to be accurately positioned within the pipe (110) upon eversion into the pipe (110);
   c. choosing the pipe-liner length so that the pipe-liner (130) is caused to be accurately positioned within the pipe (110) upon eversion into the pipe (110);
   d. placing the extender-tube first end (122) exterior to the pipe (110) at a predetermined position from the pipe opening end (112) so that the pipe-liner (130) is caused to be accurately positioned within the pipe (110) upon eversion into the pipe (110);
   e. everting the combined extender-tube (120) and pipe-liner (130) via fluid under pressure that has been introduced into an interior of the extended liner (150) to drive at least part of the eversion process progressively so that:
      i. the extender-tube (120) is first to evert and drags the pipe-liner (130) through the everted extender-tube (120);

ii. the pipe-liner (130) then everts after eversion of the extender-tube (120) is completed; and iii. the pipe-liner (130) becomes positioned at a desired position within the pipe (110) via the selected predetermined extender-tube length, the selected predetermined pipe-liner length, and the placement of the extender-tube first end (122) exterior to the pipe (110) at the predetermined position from the pipe opening end (112); and f. detaching the extender-tube (120) from the pipe-liner (130) via the removable, substantially leak-proof connection (160) and removing the detached extender-tube (120) from the pipe (110).

2. The method of claim 1, wherein the pipe-liner (130) becomes positioned at the desired position within the pipe (110) such that the pipe-liner lines at least a defective section of the pipe (110) when everted.

3. The method of claim 1, wherein the extended liner (150) is loaded into a launch chamber (180) having an outlet aperture (182), wherein a portion of the extender-tube (120) at the extender-tube first end (122) is disposed through the outlet aperture (182), everted, and connected back to the outlet aperture (182), wherein the launch chamber (180) is positioned exterior to the pipe (110) such that outlet aperture (182) is adjacent to the pipe opening end (112), wherein the pressurized fluid is introduced into an interior (184) of the launch chamber to drive at least part of the eversion of the extended liner (150) progressively into the pipe (110).

4. The method of claim 1, wherein the pipe-liner (130) comprises a tube of an absorbent material (136) impregnated with a hardenable fluid, whereupon eversion of the pipe-liner (130), the absorbent material (136) interfaces with the pipe interior surface (114).

5. The method of claim 4, further comprising hardening the hardenable fluid after everting the extended liner (150).

6. The method of claim 5, further comprising supporting the fully everted pipe-liner (130) against the pipe interior surface (114) being lined while the hardenable fluid is hardening.

7. The method of claim 6, wherein the supporting step comprises inserting a pressure-tube (170) of a flexible material into the pipe (110) such that the pressure-tube (170) is positioned at least along the length of the pipe-liner, and filling the pressure-tube (170) with fluid under pressure so that the pressure-tube presses the pipe-liner (130) against the pipe interior surface (114) being lined.

8. The method of claim 6, wherein the supporting step comprises launching a pressure-tube (170) of a flexible material from an outlet aperture (182) of a launch chamber (180), and everting said pressure-tube (170) into the pipe (110) via fluid under pressure such that the pressure-tube presses the pipe-liner (130) against the pipe interior surface (114) being lined.

9. The method of claim 6, further comprising substantially hermetically sealing the pressure-tube during the supporting step.

10. The method of claim 4, wherein the pipe-liner (130) further comprises an impermeable plastic skin (138) that forms an exterior surface of the pipe-liner (130) prior to eversion, and when the pipe-liner (130) is everted, the impermeable plastic skin (138) forms an interior surface of the pipe-liner (130).

11. The method of claim 1, wherein the removable, substantially leak-proof connection (160) is a flexible intermediate collar or connector sleeve (165) connecting the extender-tube second end (124) to the pipe-liner first end (132), wherein detaching the extender-tube (120) from the pipe-liner (130) comprises detaching the intermediate collar or connector sleeve (165) from the pipe-liner first end (132).

12. The method of claim 11, wherein the intermediate collar or connector sleeve (165) is welded to the extender-tube second end (124), thereby forming a fixed, substantially leak-proof joint.

13. The method of claim 11, wherein the intermediate collar or connector sleeve (165) is adhered to the pipe-liner first end (132) via an adhesive, thereby forming a removable, substantially leak-proof joint that enables detachment of the intermediate collar or connector sleeve (165) from the pipe-liner first end (132) upon application of a pulling force to the extender tube (120).

14. A pipe-liner system (100) for lining a pipe interior surface (114) of a pipe (110), wherein the system (100) comprises:

a. an eversible, flexible, substantially-impermeable, elongate, extender-tube (120) having an extender-tube first end (122) and an extender-tube second end (124), wherein a selectable extender-tube length is measured from the extender-tube first end (122) to the extender-tube second end (124);

b. an eversible, flexible, elongate, tubular, pipe-liner (130) having a pipe-liner first end (132) and a pipe-liner second end (134), wherein a selectable pipe-liner length is measured from the pipe-liner first end (132) to the pipe-liner second end (134); and c. a removable, substantially leak-proof connection (160) connecting the extender-tube second end (124) to the pipe-liner first end (132);

wherein the combined extender-tube (120) and the pipe-liner (130) form a single continuous eversible tube, hereinafter referred to as an extended liner (150), wherein the extender-tube length and the pipe-liner length are each chosen so that the pipe-liner (130) liner is caused to be accurately positioned within the pipe (110) upon eversion of the extended liner (150), wherein for installation, the extender-tube first end (122) is disposed exterior to the pipe (110) at a selectable predetermined position from the pipe opening end (112), wherein the combined extender-tube (120) and pipe-liner (130) can be everted via fluid under pressure that has been introduced into an interior of the extended liner (150) to drive at least part of the eversion process progressively so that the extender-tube (120) can first evert and drag the pipe-liner (130) through the everted extender-tube (120) so that the pipe-liner (130) can then evert after the eversion of the extender-tube (120) is completed so that the pipe-liner (130) becomes positioned at a desired position in the pipe (110) via the selected predetermined extender-tube length, the selected predetermined pipe-liner length, and the placement of the extender-tube first end (122) exterior to the pipe (110) at the selected predetermined position from the pipe opening end (112).

15. The system of claim 14, wherein the removable, substantially leak-proof connection (160) comprises a connection first end (162) that is welded to the extender-tube second end (124), and a connection second end (164) that is adhered to the to the pipe-liner first end (132), wherein the extender-tube (120) is configured to be detached from the pipe-liner (130) upon application of a pulling force to the extender tube (120) such that the connection second end (164) is disconnected from the pipe-liner first end (132).

16. The system of claim 14, further comprising a launch chamber (180), wherein the extended liner (150) is configured to be loaded into the launch chamber (180), wherein a portion of the extender-tube (120) at the extender-tube first end (122) is configured to be disposed through an outlet aperture (182) of the launch chamber, everted, and connected back to the outlet aperture (182), wherein the launch chamber (180) is configured to be positioned exterior to the pipe (110) such that outlet aperture (182) is adjacent to the pipe opening end (112), wherein pressurized fluid can be introduced into an interior (184) of the launch chamber so as to drive at least part of the eversion of the extended liner (150) progressively into the pipe (110).

17. The system of claim 14, wherein the pipe-liner (130) comprises a tube of an absorbent material (136) impregnated with a hardenable fluid and having an impermeable plastic skin (138), wherein the plastic skin (138) forms an exterior surface of the pipe-liner (130) prior to eversion, whereupon eversion of the pipe-liner (130), the impermeable plastic skin (138) forms an interior surface of the pipe-liner (130) and the absorbent material (136) is configured to interface with the pipe interior surface (114), wherein the hardenable fluid is capable of hardening after eversion of the pipe-liner (130).

18. The system of claim 14, further comprising a pressure-tube (170) of a flexible material.

19. The system of claim 18, wherein the pressure-tube (170) is configured to be inserted into the pipe (110) such that the pressure-tube (170) is positioned at least along the length of the pipe-liner, wherein the pressure-tube (170) can be filled with fluid under pressure so that the pressure-tube can press the pipe-liner (130) against the pipe interior surface (114) being lined.

20. The system of claim 18, wherein the pressure-tube (170) is configured to be launched from an outlet aperture (182) of a launch chamber (180) and everted into the pipe (110) via fluid under pressure so that the pressure-tube can press the pipe-liner (130) against the pipe interior surface (114) being lined.

* * * * *